US012746900B2

(12) United States Patent
Saotome et al.

(10) Patent No.: US 12,746,900 B2
(45) Date of Patent: Sep. 29, 2026

(54) CONTROL APPARATUS FOR ELECTRIC BRAKE, ELECTRIC BRAKE APPARATUS, AND METHOD FOR CONTROLLING ELECTRIC BRAKE

(71) Applicant: Hitachi Astemo, Ltd., Hitachinaka (JP)

(72) Inventors: Suguru Saotome, Hitachinaka (JP); Hirohito Tada, Hitachinaka (JP); Norikazu Matsuzaki, Hitachinaka (JP); Masayuki Kikawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 430 days.

(21) Appl. No.: 18/282,611

(22) PCT Filed: Mar. 7, 2022

(86) PCT No.: PCT/JP2022/009647
§ 371 (c)(1),
(2) Date: Sep. 18, 2023

(87) PCT Pub. No.: WO2022/202243
PCT Pub. Date: Sep. 29, 2022

(65) Prior Publication Data
US 2024/0166177 A1 May 23, 2024

(30) Foreign Application Priority Data
Mar. 23, 2021 (JP) ................................ 2021-048906

(51) Int. Cl.
*B60T 13/74* (2006.01)
*B60T 8/171* (2006.01)
(Continued)

(52) U.S. Cl.
CPC .............. *B60T 8/172* (2013.01); *B60T 8/171* (2013.01); *B60T 13/588* (2013.01); (Continued)

(58) Field of Classification Search
CPC ........ B60T 8/171; B60T 8/172; B60T 13/588; B60T 13/746; B60T 13/145; H02P 3/04
See application file for complete search history.

(56) References Cited

U.S. PATENT DOCUMENTS 9,221,442 B2 12/2015 Yasui et al.
9,434,368 B2 * 9/2016 Ohara .................. B60T 13/662
(Continued)

FOREIGN PATENT DOCUMENTS

JP 2001-289273 10/2001
JP 2004-142518 5/2004
(Continued)

OTHER PUBLICATIONS

Extended European Search Report issued Sep. 9, 2024 in corresponding European Patent Application No. 22775039.5.
(Continued)

*Primary Examiner* — Thomas W Irvin
(74) *Attorney, Agent, or Firm* — Wenderoth, Lind & Ponack, L.L.P.

(57) ABSTRACT

In a holding actuation of a parking brake mechanism, a braking control apparatus is configured to determine an application stroke from a load detection point including as far as an overshoot amount. The load detection point is a generation point of a thrust force that is detected due to a current flowing in an electric motor. The overshoot amount is generated based on a rotation of the electric motor due to inertia after driving of the electric motor is stopped. The braking control apparatus is configured to determine a target release stroke in a release of the parking brake mechanism, according to the application stroke. The braking control apparatus is configured to output a control instruction to conduct the release based on the target release stroke.

13 Claims, 20 Drawing Sheets

(51) Int. Cl.

| | |
|---|---|
| ***B60T 8/172*** | (2006.01) |
| ***B60T 13/58*** | (2006.01) |
| ***H02P 3/04*** | (2006.01) |
| *B60T 13/14* | (2006.01) |

(52) U.S. Cl.

CPC .............. *B60T 13/746* (2013.01); *H02P 3/04* (2013.01); *B60T 13/145* (2013.01)

(56) References Cited

U.S. PATENT DOCUMENTS

| | | | | |
|---|---|---|---|---|
| 9,441,689 | B2 * | 9/2016 | Baehrle-Miller | F16D 65/18 |
| 9,604,608 | B2 * | 3/2017 | Yasui | B60T 8/172 |
| 10,137,878 | B2 * | 11/2018 | Ritter | B60T 13/741 |
| 10,427,661 | B2 * | 10/2019 | Masuda | B60T 13/662 |
| 10,471,946 | B2 * | 11/2019 | Baehrle-Miller | B60T 13/741 |
| 2004/0113489 | A1 * | 6/2004 | Iwagawa | B60T 7/107 303/155 |
| 2014/0076674 | A1 * | 3/2014 | Baehrle-Miller | F16D 65/18 188/159 |
| 2015/0112564 | A1 * | 4/2015 | Yasui | F16D 61/00 701/70 |
| 2017/0106848 | A1 * | 4/2017 | Ritter | B60T 13/662 |
| 2017/0297548 | A1 * | 10/2017 | Baehrle-Miller | F16D 65/18 |
| 2021/0046909 | A1 * | 2/2021 | Saotome | B60T 13/686 |
| 2022/0073038 | A1 * | 3/2022 | Suzuki | F16D 65/18 |
| 2024/0157917 | A1 * | 5/2024 | Kobune | F16D 65/18 |

FOREIGN PATENT DOCUMENTS

| | | |
|---|---|---|
| JP | 2004-169731 | 6/2004 |
| JP | 2007-263270 | 10/2007 |

OTHER PUBLICATIONS

International Search Report issued Apr. 5, 2022 in corresponding International (PCT) Application No. PCT/JP2022/009647, with English translation.

Written Opinion issued Apr. 5, 2022 in corresponding International (PCT) Application No. PCT/JP2022/009647, with English translation.

* cited by examiner b: CONTROL CURRENT d: MOTOR STOP DETERMINATION c: CONTROL VOLTAGE e: MOTOR ROTATIONAL SPEED f: MOTOR DRIVING STATE (PREVIOUS VALUE)

Fig. 8

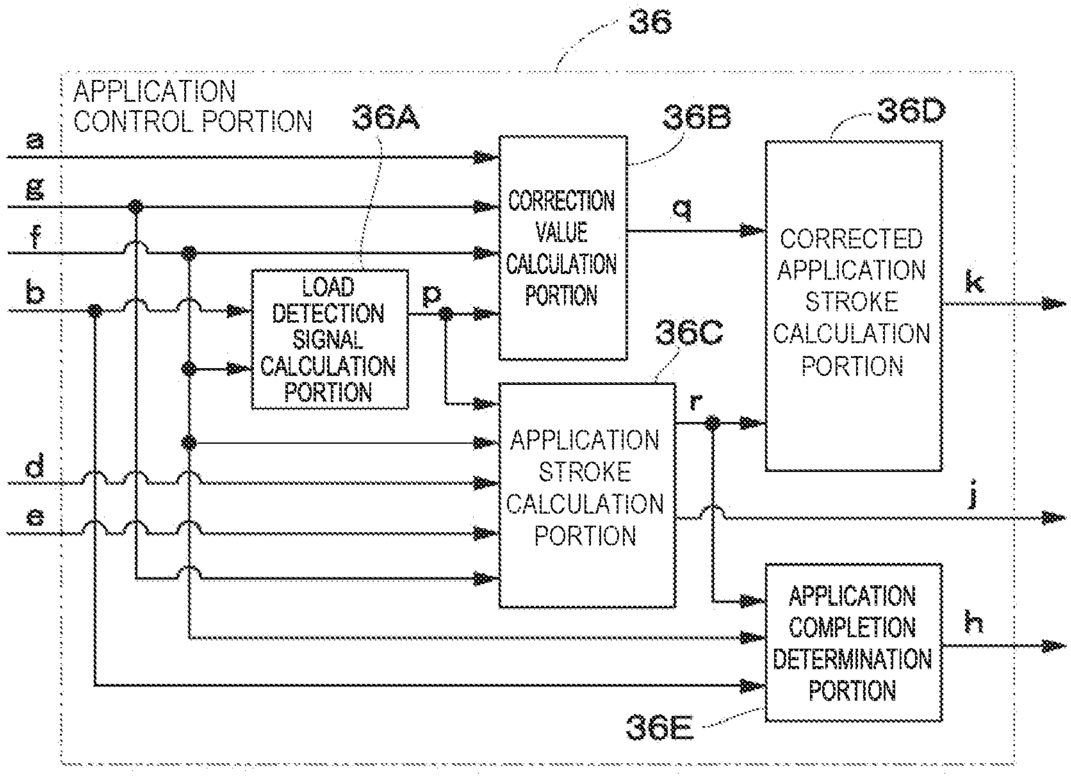

a: CONTROL HYDRAULIC PRESSURE
b: CONTROL CURRENT
d: MOTOR STOP DETERMINATION
e: MOTOR ROTATIONAL SPEED
f: MOTOR DRIVING STATE (PREVIOUS VALUE)
g: RELEASE COMPLETION DETERMINATION (PREVIOUS VALUE)
h: APPLICATION COMPLETION DETERMINATION
j: APPLICATION STROKE CALCULATION COMPLETION FLAG
k: CORRECTED APPLICATION STROKE
p: LOAD DETECTION SIGNAL
q CORRECTION VALUE
r APPLICATION STROKE f: MOTOR DRIVING STATE (PREVIOUS VALUE)
k: CORRECTED APPLICATION STROKE
I5: CORRECTED APPLICATION STROKE (STORED VALUE)
j: APPLICATION STROKE CALCULATION COMPLETION FLAG
e: MOTOR ROTATIONAL SPEED
m: RELEASE COMPLETION DETERMINATION
g: RELEASE COMPLETION DETERMINATION (PREVIOUS VALUE)
s: TARGET RELEASE STROKE
t: RELEASE STROKE

I1: PKB ACTUATION REQUEST
h: APPLICATION COMPLETION DETERMINATION
m: RELEASE COMPLETION DETERMINATION
d: MOTOR STOP DETERMINATION
n: MOTOR DRIVING STATE
O1: MOTOR DRIVING INSTRUCTION

Fig. 23

| MOTOR DRIVING INSTRUCTION | OPERATION OF DRIVING CIRCUIT (DRIVER) |
|---|---|
| STOP | OPEN MOTOR TERMINALS |
| APPLICATION | APPLY VOLTAGE IN APPLICATION DIRECTION |
| RELEASE | APPLY VOLTAGE IN RELEASE DIRECTION |
| MOTOR BRAKE | SHORT MOTOR TERMINALS |

CONTROL APPARATUS FOR ELECTRIC BRAKE, ELECTRIC BRAKE APPARATUS, AND METHOD FOR CONTROLLING ELECTRIC BRAKE

CROSS-REFERENCE TO RELATED APPLICATION

The present application claims priority under the Paris Convention to Japanese Patent Application No. 2021-048906 filed on Mar. 23, 2021. The entire disclosure of Japanese Patent Application No. 2021-048906 including the specification, the claims, the drawings, and the abstract is incorporated herein by reference in its entirety.

TECHNICAL FIELD

The present disclosure relates to a control apparatus for an electric brake, an electric brake apparatus, and a method for controlling an electric brake.

BACKGROUND ART

PTL 1 discloses the following technique as a method for controlling an electric parking brake. That is, a braking operation of the parking brake is established by rotating an electric motor in a forward direction by the number of rotations corresponding to a predetermined amount of an operation of pulling a control cable. Then, the braking operation of the parking brake is released by rotating the electric motor in a reverse direction by the number of rotations corresponding to a predetermined amount of an operation of pulling the control cable. At this time, the electric motor can also be rotated in the reverse direction by the number of rotations corresponding to an operation amount with a predetermined additional stroke amount added thereto to ensure a complete release of the parking brake.

CITATION LIST

Patent Literature

PTL 1: Japanese Patent Application Publication No. 2007-263270

SUMMARY OF INVENTION

Technical Problem

Then, even when the driving of the electric motor is stopped, the electric motor does not immediately stop rotating under an inertial influence, and overshoots beyond a target rotational amount. On the other hand, PTL 1 discloses that the electric motor is rotated in the reverse direction by the number of rotations corresponding to the operation amount with the predetermined additional stroke amount added thereto to ensure a complete release of the parking brake, but fails to take the rotational amount corresponding to the above-described overshoot into consideration, thereby raising a possibility of making it difficult to secure a desired clearance.

Solution to Problem

An object of one aspect of the present invention is to provide a control apparatus for an electric brake, an electric brake apparatus, and a method for controlling an electric brake capable of improving accuracy of controlling a clearance.

According to one aspect of the present invention, a control apparatus for an electric brake includes a control portion configured to control an electric motor. The electric motor is configured to drive a parking brake mechanism. The parking brake mechanism is configured to provide a braking force to a vehicle and hold the braking force. In an application, which refers to holding actuation of the parking brake mechanism, the control portion determines a physical amount regarding a loaded stroke at the time of the application from a load detection point including as far as an overshoot amount. The load detection point is a generation point of a thrust force that is detected due to a current flowing in the electric motor. The overshoot amount is generated based on a rotation of the electric motor due to inertia after driving of the electric motor is stopped. The control portion determines a physical amount regarding a target release stroke in a release, which refers to release actuation of the parking brake mechanism, according to the physical amount regarding the loaded stroke at the time of the application. The control portion outputs a control instruction to conduct the release based on the physical amount regarding the target release stroke.

According to one aspect of the present invention, an electric brake apparatus includes a parking brake mechanism configured to provide a braking force to a vehicle and hold the braking force, an electric motor configured to drive the parking brake mechanism, and a control apparatus configured to control the electric motor. In an application, which refers to holding actuation of the parking brake mechanism, the control apparatus determines a physical amount regarding a loaded stroke at the time of the application from a load detection point including as far as an overshoot amount. The load detection point is a generation point of a thrust force that is detected due to a current flowing in the electric motor. The overshoot amount is generated based on a rotation of the electric motor due to inertia after driving of the electric motor is stopped. The control apparatus determines a physical amount regarding a target release stroke in a release, which refers to release actuation of the parking brake mechanism, according to the physical amount regarding the loaded stroke at the time of the application. The control apparatus outputs a control instruction to conduct the release based on the physical amount regarding the target release stroke.

According to one aspect of the present invention, a method for controlling an electric brake is provided. The electric brake is configured to control an electric motor. The electric motor is configured to drive a parking brake mechanism. The parking brake mechanism is configured to provide a braking force to a vehicle and hold the braking force. The method includes, in an application, which refers to holding actuation of the parking brake mechanism, determining a physical amount regarding a loaded stroke at the time of the application from a load detection point including as far as an overshoot amount. The load detection point is a generation point of a thrust force that is detected due to a current flowing in the electric motor. The overshoot amount is generated based on a rotation of the electric motor due to inertia after driving of the electric motor is stopped. The method further includes determining a physical amount regarding a target release stroke in a release, which refers to release actuation of the parking brake mechanism, according to the physical amount regarding the loaded stroke at the time of the application, and outputting a control instruction to conduct the release based on the physical amount regarding the target release stroke.

According to the aspects of the present invention, the accuracy of controlling the clearance can be improved.

BRIEF DESCRIPTION OF DRAWINGS

FIG. 3 is a block diagram (a circuit configuration diagram) illustrating the control apparatus illustrated in FIG. 1 together with the rear wheel-side disk brake and the like.

FIG. 8 is a block diagram illustrating an application control portion illustrated in FIG. 5.

FIG. 23 illustrates one example of the relationship between a motor driving instruction and an operation of a driving circuit as a list.

DESCRIPTION OF EMBODIMENTS

In the following description, a control apparatus for an electric brake and an electric brake apparatus according to an embodiment will be described citing an example in a case where they are mounted on a four-wheeled automobile with reference to the accompanying drawings. Each step in flowcharts illustrated in FIGS. 7, 9, 10, 12 to 14, 16 to 19, and 22 will be represented by the symbol "S" (for example, each step will be indicated like step 1="S1").

Figure 1:
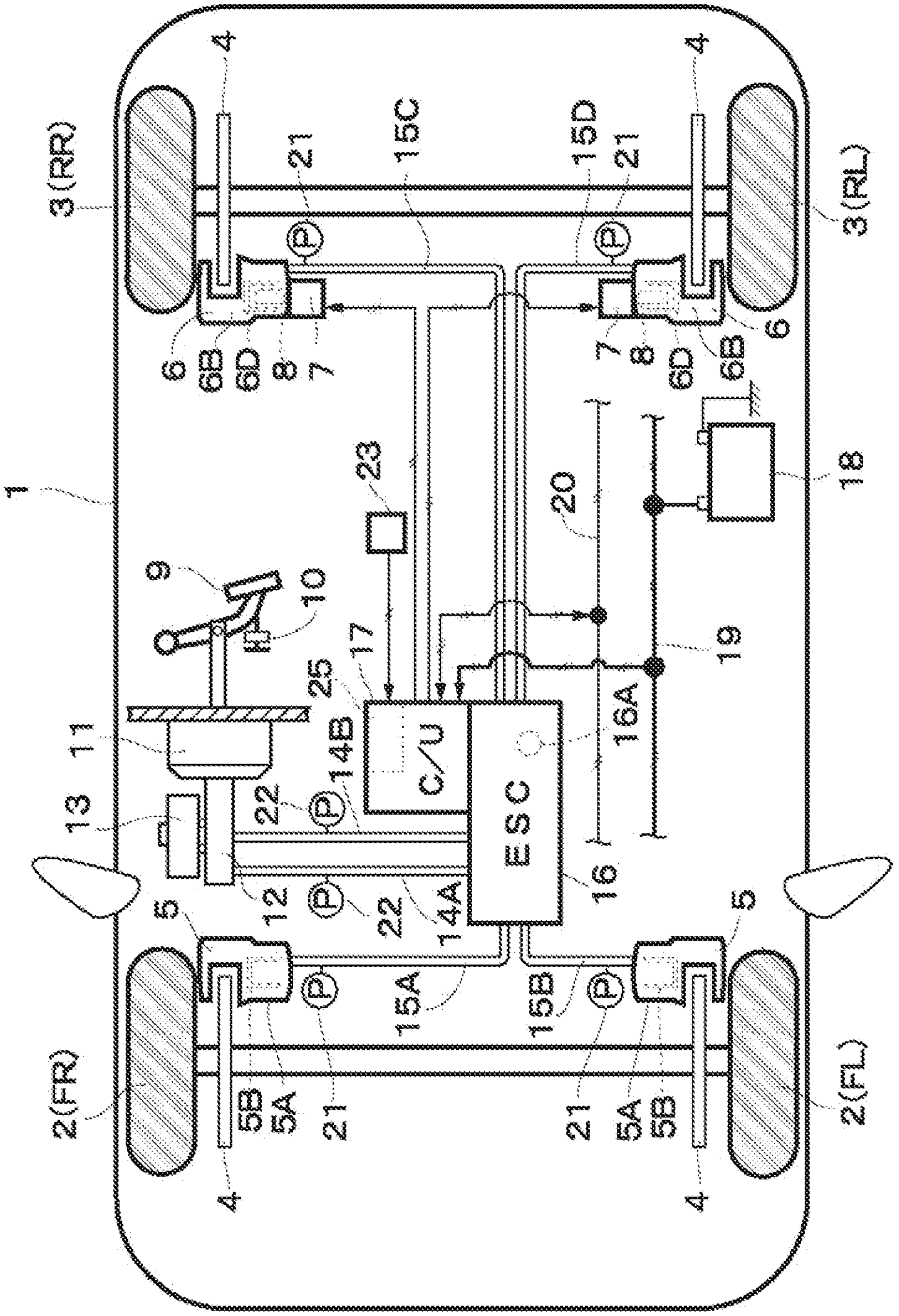
FIG. 1 is a conceptual diagram of a vehicle on which a control apparatus for an electric brake and an electric brake apparatus according to an embodiment are mounted.

In FIG. 1, four wheels in total that include, for example, left and right front wheels 2 (FL and FR) and left and right rear wheels 3 (RL and RR) are mounted under a vehicle body 1 forming a main structure of a vehicle (on a road surface side). The wheels (each of the front wheels 2 and each of the rear wheels 3) constitute the vehicle together with the vehicle body 1. A brake system for providing a braking force is mounted on the vehicle. In the following description, the brake system of the vehicle will be described.

A disk rotor 4 is provided on each of the front wheels 2 and the rear wheels 3. The disk rotor 4 serves as a braking target member (a rotational member) that rotates together with each of the wheels (each of the front wheels 2 and each of the rear wheels 3). The disk rotor 4 for the front wheel 2 is subjected to a braking force by a front wheel-side disk brake 5, which is a hydraulic disk brake. The disk rotor 4 for the rear wheel 3 is subjected to a braking force by a rear wheel-side disk brake 6, which is a hydraulic disk brake equipped with an electric parking brake function.

Figure 2:
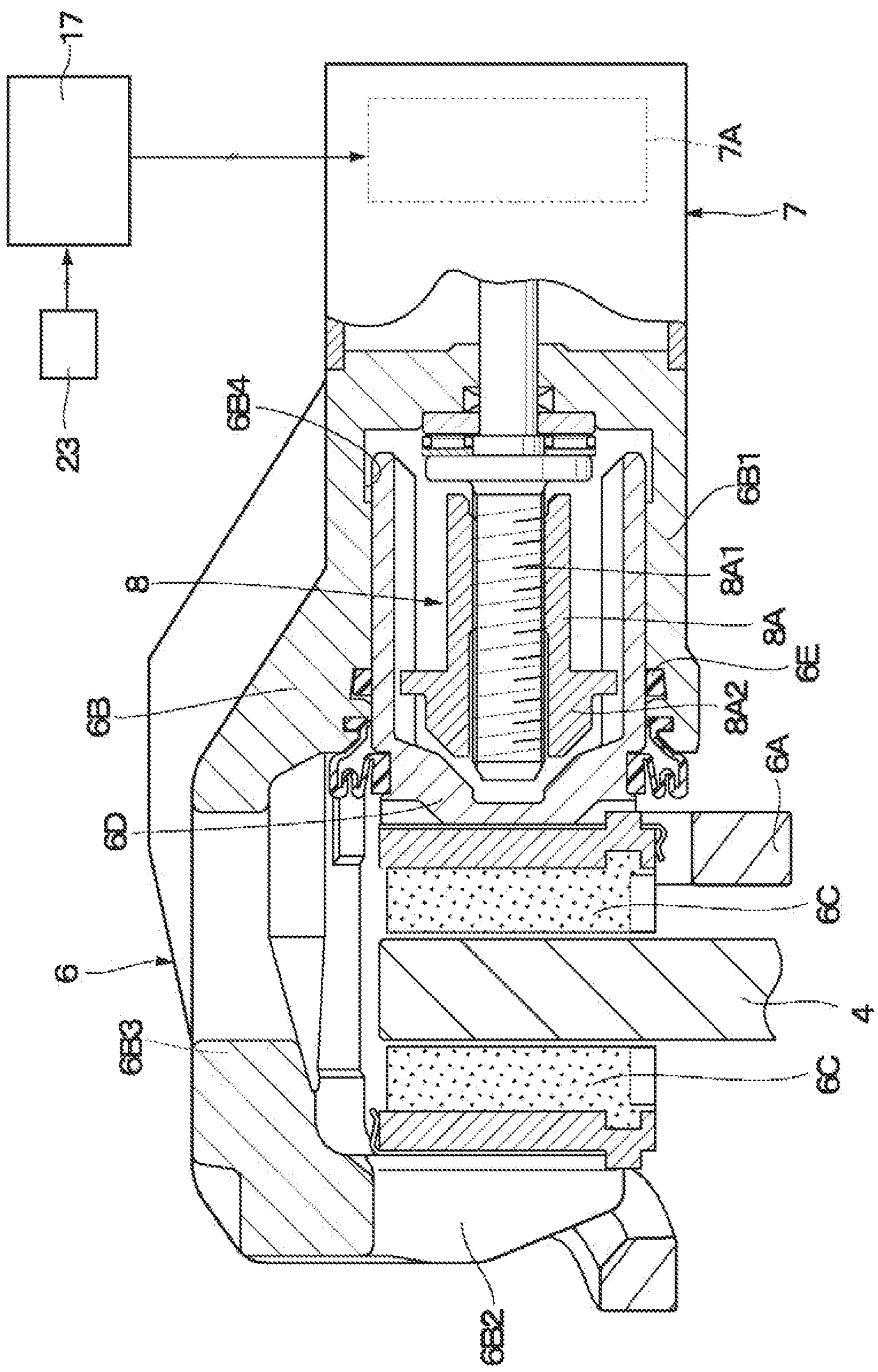
FIG. 2 is a vertical cross-sectional view illustrating an electric brake (a hydraulic disk brake equipped with an electric parking brake function) mounted on a rear wheel side illustrated in FIG. 1 in an enlarged manner.

A pair (set) of rear wheel-side disk brakes 6 provided in correspondence with the left and right rear wheels 3, respectively, is each a hydraulic brake mechanism (a hydraulic brake) that provides a braking force by pressing brake pads 6C (refer to FIG. 2) against the disk rotor 4 based on a hydraulic pressure. As illustrated in FIG. 2, each of the rear wheel-side disk brakes 6 includes, for example, a mount member 6A called a carrier, a caliper 6B as a wheel cylinder, the pair of brake pads 6C as a braking member (a frictional member or a frictional pad), and a piston 6D as a pressing member. In this case, the caliper 6B and the piston 6D constitute a cylinder mechanism, i.e., a cylinder mechanism in which the piston 6D is moved by the hydraulic pressure to press the brake pads 6C against the disk rotor 4.

The mount member 6A is fixed to a non-rotatable portion of the vehicle, and is disposed so as to extend across over the outer peripheral side of the disk rotor 4. The caliper 6B is provided on the mount member 6A movably in the axial direction of the disk 4. The caliper 6B includes a cylinder main body portion 6B1, a claw portion 6B2, and a bridge portion 6B3 connecting them. A cylinder (a cylinder hole) 6B4 is provided in the cylinder main body portion 6B1, and the piston 6D is fittedly inserted in the cylinder 6B4. The brake pads 6C are movably attached to the mount member 6A, and are disposed so as to be able to abut against the disk rotor 4. The piston 6D presses the brake pads 6C against the disk rotor 4.

Then, the caliper 6B thrusts the brake pads 6C by the piston 6D according to supply (addition) of the hydraulic pressure (a brake hydraulic pressure) into the cylinder 6B4 based on an operation on a brake pedal 9 or the like. At this time, the brake pads 6C are pressed against the both surfaces of the disk rotor 4 by the claw portion 6B2 of the caliper 6B and the piston 6D. As a result, a braking force is provided to the rear wheel 3 rotating together with the disk rotor 4.

Further, the rear wheel-side disk brake 6 includes an electric actuator 7 and a rotation-liner motion conversion mechanism 8. The electric actuator 7 includes an electric motor 7A as an electrically-driven motor, and a speed reducer (not illustrated) that slows down the rotation of this electric motor 7A. The electric motor 7A serves as a thrust source (a driving source) for thrusting the piston 6D. The rotation-linear motion conversion mechanism 8, which is a rotation-linear motion mechanism, constitutes a holding mechanism (a pressing member holding mechanism) that holds the force pressing the brake pads 6C.

In this case, the rotation-linear motion conversion mechanism 8 includes a rotation-linear motion member 8A. The rotation-linear motion member 8A converts a rotation of the electric motor 7A into an axial displacement (a linear displacement) of the piston 6D and also thrusts this piston 6D. The rotation-linear motion member 8A includes, for example, a threaded member 8A1 and a linear motion member 8A2. The threaded member 8A1 is made of an externally threaded rod-like member. The linear motion member 8A2 serves as a thrust member including an internal thread hole formed on the inner peripheral side thereof. The rotation-linear motion conversion mechanism 8 converts the rotation of the electric motor 7A into the axial displacement of the piston 6D, and also holds the piston 6D thrust by the electric motor 7A. In other words, the rotation-linear motion conversion mechanism 8 provides a thrust force to the piston 6D using the electric motor 7A and thrusts the brake pads 6C by this piston 6D to press the disk rotor 4, and then holds the thrust force on this piston 6D.

The rotation-linear motion conversion mechanism 8 constitutes an electric mechanism of the electric parking brake apparatus (the electric brake apparatus) together with the electric motor 7A. The electric mechanism converts the rotational force of the electric motor 7A into the thrust force via a speed reducer and the rotation-linear motion conversion mechanism 8 to thrust (displace) the piston 6D, thereby pressing the brake pads 6C against the disk rotor 4 and holding the braking force on the vehicle. The electric motor 7A drives the electric mechanism. Such an electric mechanism (i.e., the electric motor 7A and the rotation-linear motion conversion mechanism 8) constitutes the electric parking brake apparatus (the electric brake apparatus) together with a braking control apparatus 17, which will be described below.

The rear wheel-side disk brake 6 thrusts the piston 6D using the brake hydraulic pressure generated based on the operation on the brake pedal 9 or the like to press the disk rotor 4 with the brake pads 6C, thereby providing the braking force to the wheel (the rear wheel 3) and thus the vehicle. In addition thereto, the rear wheel-side disk brake 6 thrusts the piston 6D using the electric motor 7A via the rotation-linear motion conversion mechanism 8 according to an actuation request based on a signal from a parking brake switch 23 or the like, thereby providing a braking force (a parking brake or an auxiliary brake while the vehicle is running when necessary) to the vehicle, as will be described below.

In other words, the rear wheel-side disk brake 6 drives the electric motor 7A to thrust the piston 6D by the rotation-linear motion member 8A, thereby pressing the brake pads 6C against the disk rotor 4 and holding them. In this case, the rear wheel-side disk brake 6 thrusts the piston 6D using the electric motor 7A and holds the braking of the vehicle according to a parking brake request signal (an application request signal), which serves as an application request for providing the parking brake (the brake used to park the vehicle). Along therewith, the rear wheel-side disk brake 6 brakes the vehicle based on the supply of the hydraulic pressure from a hydraulic pressure source (a master cylinder 12, which will be described below, or a hydraulic pressure supply apparatus 16 as necessary) according to the operation on the brake pedal 9.

In this manner, the rear wheel-side disk brake 6 includes the rotation-linear motion conversion mechanism 8, which presses the brake pads 6C against the disk rotor 4 by the electric motor 7A and holds the force pressing these brake pads 6C, and is also configured to be able to press the brake pads 6C against the disk rotor 4 by the hydraulic pressure added separately from the pressing by the electric motor 7A.

On the other hand, a pair (set) of front wheel-side disk brakes 5 provided in correspondence with the left and right front wheels 2, respectively, is configured in an approximately similar manner to the rear wheel-side disk brakes 6, except for the mechanism relating to the operation of the parking brake. More specifically, as illustrated in FIG. 1, each of the front wheel-side disk brakes 5 includes a mount member (not illustrated), a caliper 5A, brake pads (not illustrated), a piston 5B, and the like, but does not include the electric actuator 7 (the electric motor 7A), the rotation-linear motion conversion mechanism 8, and the like for actuating and releasing the parking brake. However, the front wheel-side disk brake 5 is similar to the rear wheel-side disk brake 6 in terms of thrusting the piston 5B using the hydraulic pressure generated based on, for example, the operation on the brake pedal 9 to provide the braking force to the wheel (the front wheel 2) and thus the vehicle. In other words, the front wheel-side disk brake 5 is a hydraulic brake mechanism (a hydraulic brake) that provides the braking force by pressing the brake pads against the disk rotor 4 using the hydraulic pressure.

The disk brake equipped with the electric parking brake function may be employed as the front wheel-side disk brake 5, similarly to the rear wheel-side disk brake 6. Alternatively, the hydraulic disk brake may be employed as the rear wheel-side disk brake, and the hydraulic disk brake equipped with the electric parking brake function may be employed as the front wheel-side disk brake. Further, in the embodiment, the hydraulic disk brake 6 including the electric motor 7A is used as the electric brake (the electric parking brake). However, the electric brake (the electric brake mechanism) is not limited thereto, and examples usable as that include an electric disk brake equipped with an electric caliper, an electric drum brake that provides a braking force by pressing shoes against a drum using an electric motor, a disk brake equipped with an electric drum-type parking brake, and a cable puller-type electric parking brake that actuates an application of a parking brake by pulling a cable using an electric motor. In other words, various types of electric brakes (electric brake mechanisms) can be used as the electric brake (the electric brake mechanism), as long as the electric brake is configured to be able to press (thrust) a frictional member (a pad or a shoe) against a rotational member (a rotor or a drum) based on driving of an electric motor (an electric actuator), and hold and release this pressing force.

The brake pedal 9 is provided on a dashboard side of the vehicle body 1. The brake pedal 9 is operated by being pressed by a driver (an operator) at the time of the operation of braking the vehicle. Each of the disk brakes 5 and 6 provides and releases the braking force as a regular brake (a service brake) based on the operation on the brake pedal 9. A brake operation detection sensor (a brake sensor) 10, such as a brake lamp switch, a pedal switch (a brake switch), or a pedal stroke sensor, is provided at the brake pedal 9.

The brake operation detection sensor 10 is connected to the braking control apparatus 17, which is an ECU (Electronic Control Unit). The brake operation detection sensor 10 detects presence or absence of the operation of pressing the brake pedal 9 or an operation amount thereof, and outputs a detection signal thereof to the braking control apparatus 17. The detection signal of the brake operation detection sensor 10 is transmitted via, for example, a vehicle data bus 20 (for example, is output to another control apparatus, such as a control apparatus for suspension control).

The operation of pressing the brake pedal 9 is transmitted to the master cylinder 12, which functions as an oil pressure source (a hydraulic pressure source), via a booster 11. The booster 11 is configured as a negative-pressure booster (an atmospheric-pressure booster) or an electric booster (an electrically-driven booster) provided between the brake pedal 9 and the master cylinder 12. The booster 1I powers up the pressing force and transmits it to the master cylinder 12 at the time of the operation of pressing the brake pedal 9. At this time, the master cylinder 12 generates a hydraulic pressure based on brake fluid supplied (replenished) from a master reservoir 13. The master reservoir 13 is a hydraulic fluid tank that contains the brake fluid therein. The mechanism for generating the hydraulic pressure by the brake pedal 9 is not limited to the above-described configuration, and may be a mechanism that generates the hydraulic pressure according to the operation on the brake pedal 9, such as a brake-by-wire type mechanism.

The hydraulic pressure generated in the master cylinder 12 is transmitted to a hydraulic pressure supply apparatus 16 (hereinafter referred to as an ESC 16) via, for example, a pair of cylinder-side hydraulic pressure pipes 14A and 14B. The hydraulic pressure transmitted to the ESC 16 is supplied to the individual disk brakes 5 and 6 via brake-side pipe portions 15A, 15B. 15C, and 15D. The ESC 16 is disposed between each of the disk brakes 5 and 6 and the master cylinder 12. The ESC 16 distributes and supplies the hydraulic pressure output from the master cylinder 12 via the cylinder-side hydraulic pressure pipes 14A and 14B to the individual disk brakes 5 and 6 via the brake-side pipe portions 15A, 15B, 15C, and 15D.

Now, the ESC 16 is a hydraulic pressure control apparatus that controls the hydraulic pressure of the hydraulic brake (the front wheel-side disk brakes 5 and the rear wheel-side disk brakes 6). To fulfill this function, the ESC 16 includes a plurality of control valves (not illustrated), a hydraulic pressure pump that pressurizes the brake hydraulic pressure (not illustrated), an electric motor 16A that drives this hydraulic pressure pump (FIG. 3), and a reservoir for controlling the hydraulic pressure that temporarily stores extra brake fluid therein (not illustrated). Each of the control valves and the electric motor 16A in the ESC 16 are connected to the braking control apparatus 17, and the ESC 16 includes the braking control apparatus 17.

The opening/closing of each of the control valves and the driving of the electric motor 16A in the ESC 16 are controlled by the braking control apparatus 17. In other words, the braking control apparatus 17 is an ESC control unit that controls the ESC 16 (an ECU for the ESC). The braking control apparatus 17 includes a microcomputer, and electrically controls the driving of the ESC 16 (a solenoid of each of the control valves and the electric motor 16A therein). In this case, for example, an arithmetic circuit 24 and an ESC driving circuit 27 are built in the braking control apparatus 17. The arithmetic circuit 24 controls the supply of the hydraulic pressure from the ESC 16 and detects a malfunction of the ESC 16. The ESC driving circuit 27 drives the electric motor 16A and each of the control valves.

As will be described below, in addition to being the control unit for the ESC (the ECU for ESC) as the ESC control apparatus that controls the ESC 16, the braking control apparatus 17 is also a control unit for the parking brake (an ECU for the parking brake) as a parking brake control apparatus that controls the rear wheel-side disk brakes 6 (the electric motors 7A thereof). In other words, in the embodiment, the ESC control apparatus (the control unit for the ESC) and the parking brake control apparatus (the control unit for the parking brake) are formed by the single braking control apparatus 17. As will be described below, the braking control apparatus 17 includes the microcomputer, and electrically controls the driving of the ESC 16 (the solenoid of each of the control valves and the electric motor 16A therein). In addition thereto, the braking control apparatus 17 electrically controls the driving of the electric motors 7A of the rear wheel-side disk brakes 6. The configuration of the braking control apparatus 17 will be described in detail below.

The braking control apparatus 17 individually controls the driving of each of the control valves (the solenoid thereof) and the electric motor 16A for the hydraulic pressure pump in the ESC 16. Due to this control, the braking control apparatus 17 performs control of reducing, maintaining, and increasing or pressurizing the brake hydraulic pressure (a wheel cylinder hydraulic pressure) to supply to each of the disk brakes 5 and 6 via the brake-side pipe portions 15A to 15D for each of the disk brakes 5 and 6 individually. In this case, the braking control apparatus 17 performs, for example, braking force distribution control, anti-lock brake control (hydraulic ABS control), vehicle stabilization control, hill start aid control, traction control, vehicle following control, traffic lane departure avoidance control, and obstacle avoidance control (automatic brake control or brake control for reducing collision damage) by controlling the actuation of the ESC 16.

The ESC 16 directly supplies the hydraulic pressure generated in the master cylinder 12 to the disk brakes 5 and 6 (the calipers 5A and 6B thereof) at the time of a normal operation in response to the brake operation performed by the driver. On the other hand, for example, the ESC 16 maintains the hydraulic pressure in the disk brake 5 or 6 by closing a control valve for a pressure increase when performing the anti-lock brake control or the like, and discharges the hydraulic pressure in the disk brake 5 or 6 so as to release it to the reservoir for controlling the hydraulic pressure by opening a control valve for a pressure reduction when reducing the hydraulic pressure in the disk brake 5 or 6. Further, when increasing or pressurizing the hydraulic pressure to supply to the disk brake 5 or 6 to perform, for example, the stabilization control (electronic stability control) when the vehicle is running, the ESC 16 actuates the hydraulic pressure pump by the electric motor 16A with a control valve for supply closed, thereby supplying the brake fluid discharged from this hydraulic pressure pump to the disk brake 5 or 6. At this time, the brake fluid in the master reservoir 13 is supplied from the master cylinder 12 side toward an intake side of the hydraulic pressure pump.

Power from a battery 18 (or a generator driven by an engine), which serves as a vehicle power source, is supplied to the braking control apparatus 17 via a power source line 19. As illustrated in FIG. 1, the braking control apparatus 17 is connected to the vehicle data bus 20. Instead of the ESC 16, a known ABS unit can also be used. Alternatively, the master cylinder 12 and the brake-side pipe portions 15A to 15D can also be directly connected to each other without the provision of the ESC 16 (i.e., with the ESC 16 omitted).

The vehicle data bus 20 constitutes a CAN (Controller Area Network) as a serial communication portion mounted on the vehicle body 1. A large number of electronic apparatuses mounted on the vehicle (for example, various kinds of ECUs including the braking control apparatus 17) carry out in-vehicle multiplex communication with one another via the vehicle data bus 20. In this case, examples of vehicle information transmitted to the vehicle data bus 20 include information (vehicle information) based on detection signals (output signals) from the brake operation detection sensor 10, an ignition switch, a safety belt sensor, a door lock sensor, a door opening sensor, a seat occupancy sensor, a vehicle speed sensor, a steering angle sensor, an accelerator sensor (an accelerator operation sensor), a throttle sensor, an engine rotation sensor, a stereo camera, a millimeter-wave radar, a slope sensor (an inclination sensor), a gearshift sensor (transmission data), an acceleration sensor (a G sensor), a wheel speed sensor, a pitch sensor that detects a motion of the vehicle in a pitch direction, and the like.

Figure 3:
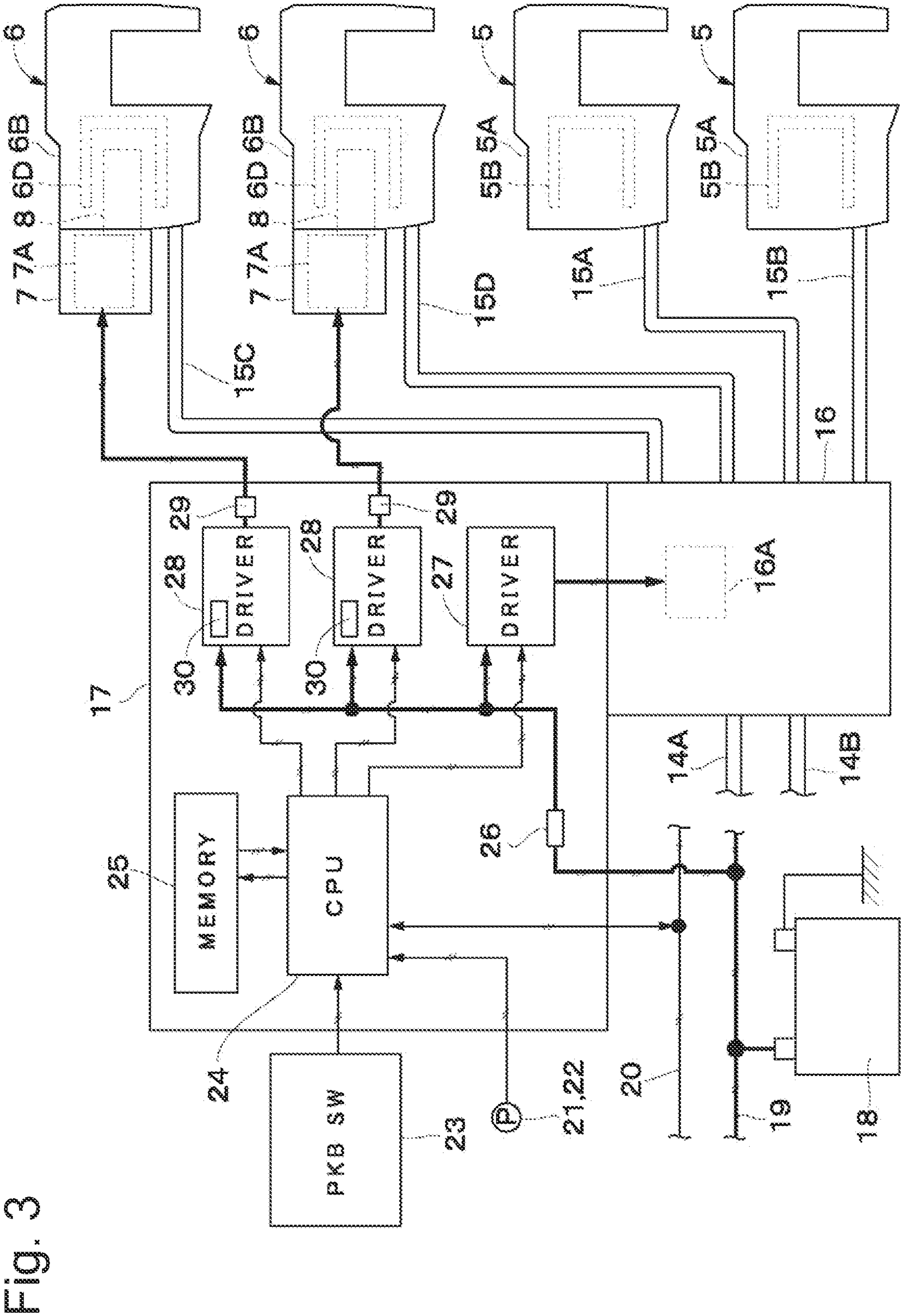

Further, the examples of the vehicle information transmitted to the vehicle data bus 20 also include a detection signal from a W/C pressure sensor 21, which detects the wheel cylinder pressure (the W/C pressure), and a detection signal from an M/C pressure sensor 22, which detects a master cylinder pressure (an M/C pressure). The embodiment is configured to include both the W/C pressure sensor 21 and the M/C pressure sensor 22, but, for example, the W/C pressure sensor 21 may be omitted if the W/C pressure can be estimated using the M/C pressure sensor 22. Further, the M/C pressure sensor 22 may be provided in the ESC 16, and/or the W/C pressure sensor 21 may be provided in the ESC 16. As illustrated in FIG. 3, the W/C pressure sensor 21 and the M/C pressure sensor 22 can be directly connected to, for example, the braking control apparatus 17.

Next, the electric parking brake will be described.

A parking brake switch (PKB-SW) 23 as a switch of the electric parking brake is provided in the vehicle body 1 at a position located close to a driver's seat (not illustrated). The parking brake switch 23 is an operation instruction portion operated by the driver. The parking brake switch 23 transmits a signal (an actuation request signal) corresponding to a request to actuate the parking brake (an application request working as a holding request or a release request working as a stop request) according to an operation instruction from the driver to the parking brake control apparatus 17. In other words, the parking brake switch 23 outputs an actuation request signal (an application request signal working as a holding request signal or a release request signal working as a stop request signal) for actuating the piston 6D and thus the brake pads 6C for the application (holding actuation) or for the release (release actuation) based on the driving (the rotation) of the electric motor 7A to the parking brake control apparatus 17. A signal input via the vehicle data bus 20 serving as a communication line, such as accelerator pedal operation information, may be used as the actuation request signal for the parking brake.

When the parking brake switch 23 is operated by the driver toward a braking side (an application side), i.e., when the application request for providing the braking force to the vehicle (the braking holding request) is issued, the application request signal (the parking brake request signal or the application instruction) is output from the parking brake switch 23. In this case, the electric motor 7A of the rear wheel-side disk brake 6 receives supply of power for rotating this electric motor 7A toward the braking side via the braking control apparatus 17. At this time, the rotation-linear motion conversion mechanism 8 thrusts (presses) the piston 6D toward the disk rotor 4 side based on the rotation of the electric motor 7A, and holds the thrust piston 6D. As a result, the rear wheel-side disk brake 6 is brought into a state that the braking force as the parking brake (or the auxiliary brake) is provided thereto, i.e., an application state (a braking holding state).

On the other hand, when the parking brake switch 23 is operated by the driver toward a braking release side (a release side), i.e., when the release request for releasing the braking force on the vehicle (the braking release request) is issued, the release request signal (the parking brake release request signal or a release instruction) is output from the parking brake switch 23. In this case, the electric motor 7A of the rear wheel-side disk brake 6 receives supply of power for rotating this electric motor 7A in the opposite direction from the braking side via the braking control apparatus 17. At this time, the rotation linear-motion conversion mechanism 8 releases the holding of the piston 6D (releases the pressing force generated by the piston 6D) by the rotation of the electric motor 7A. As a result, the rear wheel-side disk brake 6 is brought into a state that the application of the braking force as the parking brake (or the auxiliary brake) is released, i.e., a release state (a braking release state).

The braking control apparatus 17 as the control apparatus (the electric brake control apparatus) constitutes the electric parking brake apparatus (the electric brake apparatus) together with the rear wheel-side disk brake 6 (the electric motor 7A and the rotation-linear motion conversion mechanism 8 thereof). The braking control apparatus 17 controls the driving of the electric motor 7A. To fulfill this function, the braking control apparatus 17 includes the arithmetic circuit (CPU) 24 constituted by the microcomputer or the like and a memory 25, as illustrated in FIG. 3. Power from the battery 18 (or the generator driven by the engine) is supplied to the braking control apparatus 17 via the power source line 19. For example, the arithmetic circuit 24 can be configured as a dual-core unit (a dual-circuit unit) that performs the same processing in parallel and also mutually monitors whether there is a difference between the processing results. In this case, even when a malfunction has occurred in one of the cores (the circuits), the control can continue (can be backed up) by the other of the cores (the circuits). Alternatively, the braking control apparatus 17 may be configured to include two arithmetic circuits, i.e., an arithmetic circuit for the ESC and an arithmetic circuit for the electric parking brake, although this configuration is not illustrated herein.

As described above, the braking control apparatus 17 controls the opening/closing of each of the control valves and the driving of the electric motor 16A in the ESC 16, thereby reducing, maintaining, or increasing or pressurizing the brake hydraulic pressure to supply to each of the disk brakes 5 and 6. In addition thereto, the braking control apparatus 17 controls the driving of the electric motors 7A and 7A of the rear wheel-side disk brakes 6 and 6, thereby generating the braking force (the parking brake or the auxiliary brake) when the vehicle is parked or stopped (or is running when necessary). In other words, the braking control apparatus 17 actuates (applies or releases) the disk brakes 6 and 6 as the parking brake (the auxiliary brake when necessary) by driving the left and right electric motors 7A and 7A. To fulfill this function, the input side of the braking control apparatus 17 is connected to the parking brake switch 23, and the output side thereof is connected to the respective electric motors 7A and 7A of the disk brakes 6 and 6.

The braking control apparatus 17 includes the arithmetic circuit 24, the ESC driving circuit 27, and motor driving circuits 28 and 28 built therein. The arithmetic circuit 24 is used to control the supply of the hydraulic pressure of the ESC 16 and the application/release of the electric parking brake. The ESC driving circuit 27 is used to control, for example, the electric motor 16A of the ESC 16. The motor driving circuits 28 and 28 are used to control the electric motors 7A and 7A of the electric parking brakes.

The braking control apparatus 17 drives the left and right electric motors 7A and 7A to apply (hold) or release (stop) the left and right disk brakes 6 and 6 based on the actuation request (the application request or the release request) according to the operation performed on the parking brake switch 23 by the driver, an actuation request according to a determination of an automatic application/an automatic release of the parking brake, or the like. At this time, the rear wheel-side disk brake 6 holds or releases the piston 6D and the brake pads 6C by the rotation-linear motion conversion mechanism 8 based on the driving of each of the electric motors 7A. In this manner, the braking control apparatus 17 controls the driving of the electric motor 7A so as to thrust the piston 6D (and thus the brake pads 6C) according to the actuation request signal for the holding actuation (the application) or the release actuation (the release) of the piston 6D (and thus the brake pads 6C).

As illustrated in FIG. 3, the parking brake switch 23, the vehicle data bus 20, voltage sensor portions 26, 30, and 30, the ESC driving circuit 27, the motor driving circuits 28 and 28, current sensor portions 29 and 29, and the like, in addition to the memory 25 as a storage portion, are connected to the arithmetic circuit 24 of the braking control apparatus 17. Various kinds of state amounts of the vehicle that are required to control the ESC 16 and control (actuate) the parking brake, i.e., various kinds of vehicle information can be acquired from the vehicle data bus 20. Further, the braking control apparatus 17 can output information and instructions to various kinds of ECUs via the vehicle data bus 20.

The braking control apparatus 17 may be configured in such a manner that the vehicle information acquired from the vehicle data bus 20 is acquired by connecting a sensor that detects this information directly to the braking control apparatus 17 (the arithmetic circuit 24 thereof). Alternatively, the arithmetic circuit 24 of the braking control apparatus 17 may be configured in such a manner that the actuation request based on the determination of the automatic application/automatic release is input from another control apparatus (ECU) connected to the vehicle data bus 20. In this case, the vehicle can be configured in such a manner that the other control apparatus controls the determination of the automatic application/automatic release, instead of the braking control apparatus 17.

The braking control apparatus 17 includes the memory 25 as the storage portion embodied by, for example, a flash memory, a ROM, a RAM, or an EEPROM. The memory 25 stores therein a processing program used for the control of the ESC 16 and a processing program used for the control of the parking brake. In this case, the memory 25 stores therein, for example, a processing program for performing processing flows illustrated in FIGS. 7, 9, 10, 12 to 14, 16 to 19, and 22, which will be described below. Further, in the embodiment, an EEPROM as a nonvolatile memory is provided as the memory 25. The nonvolatile memory stores therein various kinds of information and various kinds of signals used at the time of the application and at the time of the release. A flash memory may be used as the nonvolatile memory storing the various kinds of information and the various kinds of signals therein.

In the embodiment, the ESC control apparatus, which controls the ESC 16 (the electric motor 16A and each of the control valves), and the parking brake control apparatus, which controls the parking brake (the electric motors 7A and 7A), are constituted by the single braking control apparatus 17. However, the configuration is not limited thereto, and, for example, the ESC control apparatus and the parking brake control apparatus may be configured as individual separate apparatuses from each other. Further, the braking control apparatus 17 is configured to control the two left and right rear-side disk brakes 6 and 6, but the parking brake control apparatus may be provided for each of the left and right rear-side disk brakes 6 and 6 along with the ESC control apparatus and the parking brake control apparatus configured as individual separate apparatuses. In this case, each of the parking brake control apparatuses can also be provided integrally with the rear-side disk brake 6. Further, the braking control apparatus, the ESC control apparatus, or the parking brake control apparatus may be configured integrally with a control apparatus that controls a function other than braking (various kinds of ECUs other than the braking ECU, such as a control apparatus for power steering).

As illustrated in FIG. 3, the braking control apparatus 17 includes the power source voltage sensor portion 26, the ESC driving circuit 27, the left and right motor driving circuits 28 and 28, the left and right current sensor portions 29 and 29, the left and right voltage sensor portions 30 and 30, and the like, which are built therein. The power source voltage sensor portion 26 detects a voltage fed from the power source line 19. The ESC driving circuit 27 drives each of the control valves (the solenoid thereof) and the electric motor 16A in the ESC 16. The left and right motor driving circuits 28 and 28 drive the left and right electric motors 7A and 7A of the parking brakes, respectively. The left and right current sensor portions 29 and 29 detect respective motor currents of the left and right electric motors 7A and 7A. The left and right voltage sensor portions 30 and 30 detect respective motor voltages (voltages between terminals) in the left and right electric motors 7A and 7BA.

The power source voltage sensor portion 26, the ESC driving circuit 27, the left and right motor driving circuits 28 and 28, the left and right current sensor portions 29 and 29, and the left and right voltage sensor portions 30 and 30 are each connected to the arithmetic circuit 24. The braking control apparatus 17 (the arithmetic circuit 24) monitors (checks) the voltages supplied to the electric motors 7A and the currents flowing therein by the current sensor portions 29 and 29 and the voltage sensor portions 30 and 30. The motor driving circuits 28 can switch the power supply to the electric motors 7A to ON (application or release)/OFF/shorting.

The braking control apparatus 17 (the arithmetic circuit 24) can, for example, determine whether to stop the driving of the electric motors 7A and 7A (determine whether the application is completed or determine whether the release is completed) based on, for example, the current values (the monitored current values) of the electric motors 7A and 7A that are detected by the current sensor portions 29 and 29 when applying or releasing the parking brake. The illustrated example is provided with both the "power source voltage sensor portion 26 that detects the voltage of the power source line 19" and the "left and right voltage sensor portions 30 and 30 that detect the voltages between terminals in the left and right electric motors 7A and 7A", but any one of them may be omitted.

Figure 24:
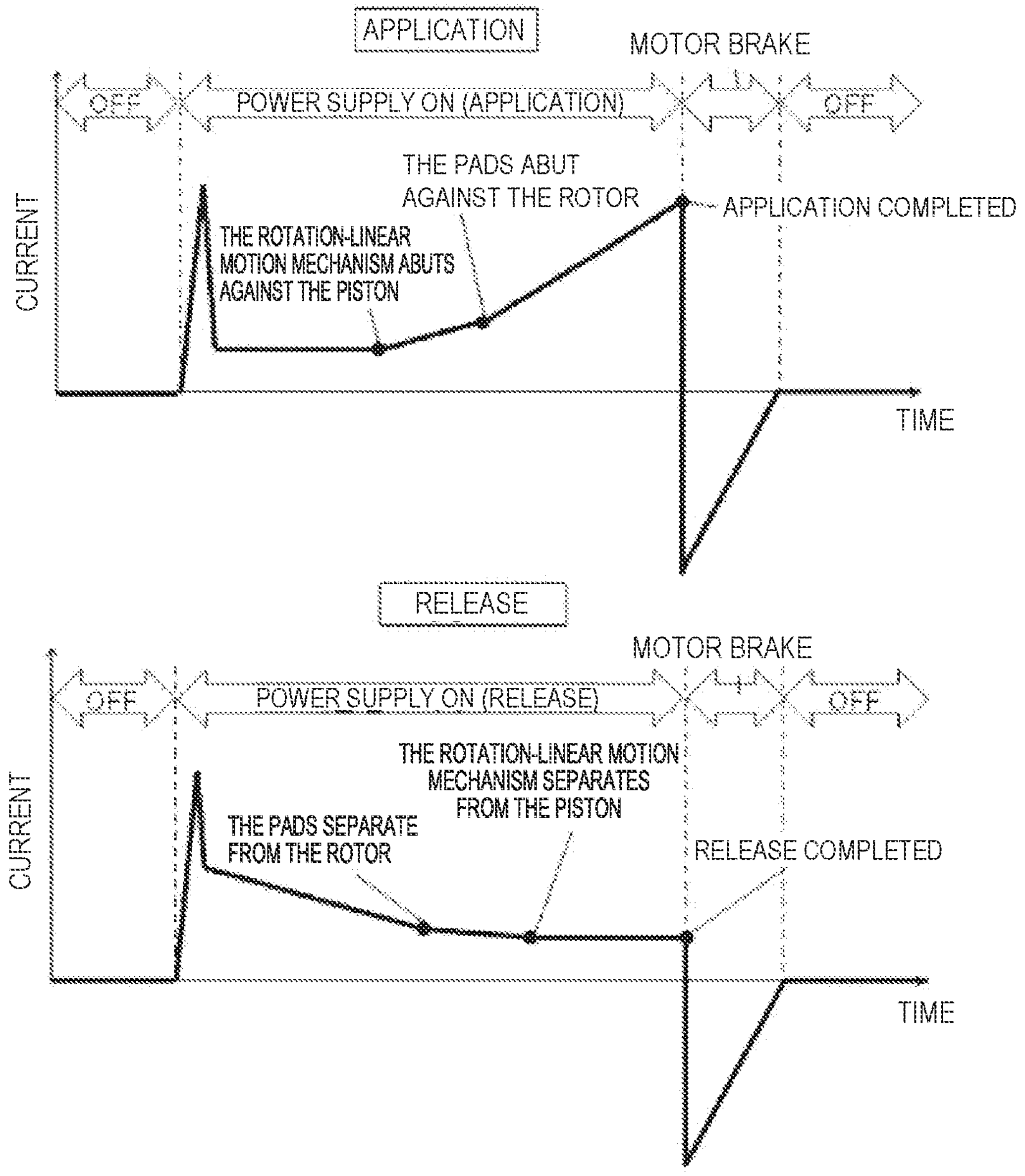
FIG. 24 is a characteristic line diagram illustrating one example of a change over time in each of currents at the time of the application and at the time of the release.

FIG. 24 illustrates an overview of a basic operation of the electric parking brake, i.e., one example of changes over time in the currents at the time of the application and at the time of the release. The braking control apparatus 17 (the arithmetic circuit 24) conducts the application, the release, or the motor brake by setting the power supply to the electric motor 7A to ON/OFF/shorting by each of the motor driving circuits 28 and 28 according to a driver's operation. Both the current waveforms during the application and the release in FIG. 24 indicate examples in which no hydraulic fluid is added (the brake pedal is not pressed). Further, basically, the current and the generated thrust force are proportional to each other.

For example, at the time of the application, the electric parking brake functions in the following manner according to an operation of setting the power supply to ON. That is, an inrush current flows according to the driving of the electric motor 7A, and, after that, a current required to cause the rotation-linear motion conversion mechanism 8 to operate (thrust the linear motion member 8A2 to the piston 6D side) flows until the rotation-linear motion conversion mechanism 8 abuts against the piston 6D. A load increases due to the abutment of the rotation-linear motion conversion mechanism 8 (the linear motion member 8A2) against the piston 6D, and the load further increases and the current also increases (the current gradient increases) due to the abutment of the brake pads 6C against the disk rotor 4. The braking control apparatus 17 determines that a braking force required to stop the vehicle is generated based on an increase in the current by a predetermined or higher degree (for example, the current reaches a preset current value), and completes the application.

On the other hand, at the time of the release, the electric parking brake functions in the following manner according to an operation of setting the power supply to ON. The load applied to the rotation-linear motion conversion mechanism 8 reduces and the current reduces due to the separation of the brake pads 6C from the disk rotor 4. The load further reduces due to the separation of the rotation-linear motion conversion mechanism 8 from the piston 6D, and the current reduces to a value required to cause the rotation-linear motion conversion mechanism 8 to operate. The release is completed after the rotation-linear motion conversion mechanism 8 (the linear motion member 8A2) separates from the piston 6D and a predetermined or larger clearance is secured.

Further, the electric parking brake functions in the following manner according to a shorting operation. When the application or the release is completed, a torque in a direction for stopping the electric motor 7A (the motor brake) is generated by causing the motor driving circuit 28 to short the motor terminals therebetween (a motor brake state) and generating a current in an opposite direction with the aid of an inductive voltage. The completion of the application and the completion of the release are determined using the current or a stroke amount estimated based on the current and the voltage in the embodiment, but may be determined using a thrust force sensor or a stroke sensor. However, using the current and the voltage is preferable in terms of a cost reduction.

Then, the above-described PTL 1 discusses the parking brake mechanism (the PKB mechanism) that presses the brake pads against the rotor to generate the braking force by performing the operation of pulling the wire based on the motor driving. According to the technique of PTL 1, the application is completed by detecting that the current reaches a current corresponding to the target thrust force to ensure the thrust force generated by the PKB mechanism. Further, a desired clearance is secured by storing a rotational amount from a load detection point at which the PKB mechanism starts generating the thrust force of pressing the pads to the arrival at the target current at the time of the application and releasing the brake by an amount equivalent to the above-described rotational amount with an additional rotational amount added thereto (=a target release rotational amount) at the time of the release.

In other words, the technique of PTL 1 calculates a stroke performed since the parking brake mechanism abuts against the piston and the load starts increasing (the load detection point) until the current reaches the threshold value, and determines that the application is completed when the current reaches the threshold value. Further, at the time of the release, the technique of PTL 1 determines that the release is completed when the piston returns by a stroke acquired by adding the above-described stroke and the predetermined clearance. The clearance corresponds to the clearance between the parking brake mechanism and the piston.

In the case of the thus-configured technique of PTL 1, two problems lie. First, even if the driving of the motor is stopped when the current reaches the target current, the rotation of the motor is not immediately stopped under an inertial influence actually and the motor overshoots. The overshoot amount changes depending on the rotational speed immediately before the application is completed, and the rotational speed varies depending on the voltage. Therefore, the conventional technique failing to reflect the overshoot amount in the above-described rotational amount may result in generation of a difference between a release rotational amount required to secure the desired clearance and the control target release rotational amount.

Figure 25:
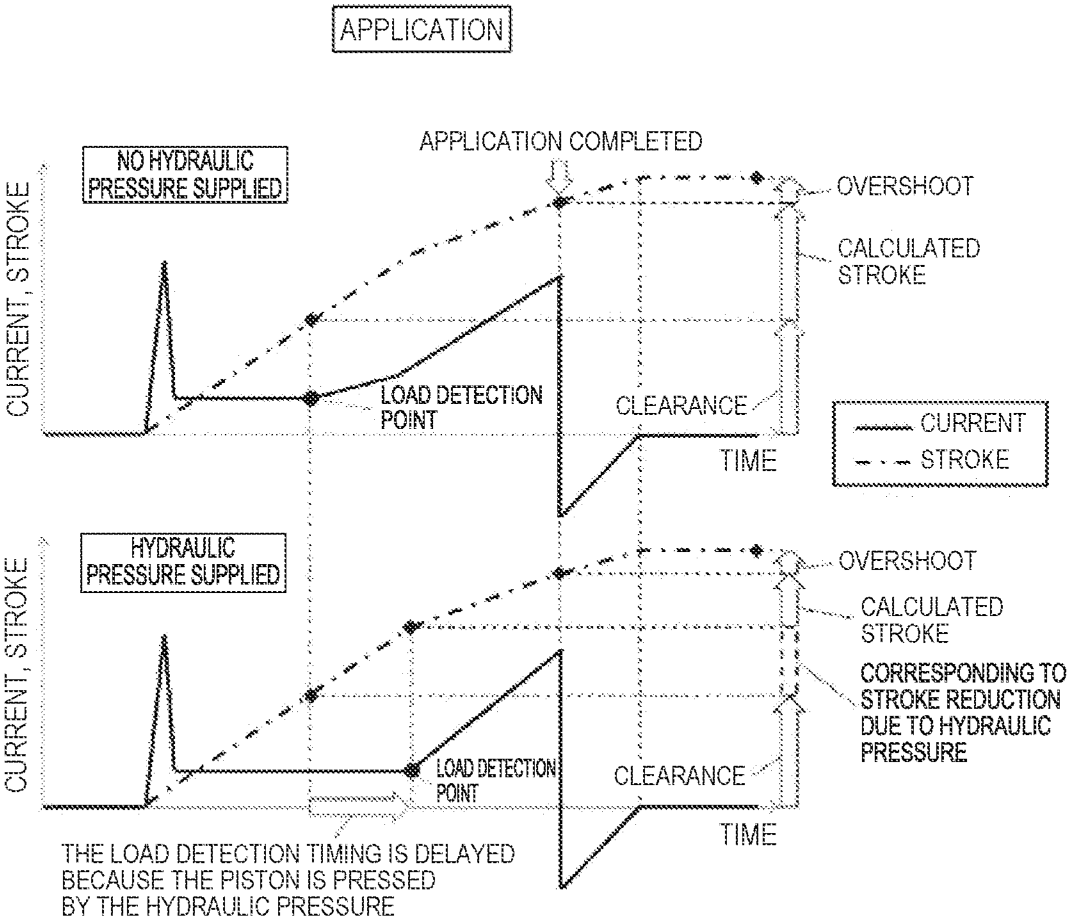
FIG. 25 is a characteristic line diagram illustrating one example of a change over time in each of currents at the time of the application with no brake hydraulic pressure supplied and at the time of the application with a brake hydraulic pressure supplied.

More specifically, as illustrated in the above-described drawing, FIG. 24, at the time of the application, the electric motor transitions from the application completion stage to the motor brake state and is subjected to a torque in the opposite direction from the rotational direction, thereby being stopped. At this time, the electric motor is not stopped immediately due to the inertia, and therefore strokes even after the application is completed as illustrated in FIG. 25 by being indicated as "OVERSHOOT". The technique of PTL 1 calculates the stroke from the load detection point to the completion of the application, thereby failing to take an amount corresponding to the overshoot into consideration. The overshoot amount depends on the rotational speed of the electric motor, and the motor rotational speed depends on the voltage. Accordingly, the technique of PTL 1 cannot be configured to deal with a change in the voltage.

Further, when a hydraulic pressure (the W/C pressure) is generated due to, for example, a driver's operation (pressing of the brake pedal), the piston is pressed in toward the rotor side. This case leads to detection of the load detection point in a state that the parking brake mechanism further strokes beyond the normal load detection point. In other words, when the pads are pressed in toward the rotor side by the hydraulic pressure, the pads are moved and the load detection point is also displaced. However, the technique of PTL 1 fails to take such a change in the load detection point into consideration (fails to reflect the displacement amount of the load detection point in the target release amount). For this reason, the stroke at the time of the release may fall short by an amount corresponding to a reduction in the application stroke due to the hydraulic pressure as illustrated in a lower characteristic line diagram in FIG. 25.

In this manner, in the case of the conventional technique, the clearance may vary or the variation may increase when the release is completed due to the failure to take the "overshoot amount" and the "change in the load detection point due to the hydraulic pressure" into consideration. In other words, with just the additional stroke added to the stroke performed since the rotation-linear motion conversion mechanism 8 abuts against the piston 6D and the load starts increasing until the application is completed, the clearance may vary due to the "amount corresponding to the overshoot until the electric motor 7A actually stops" and the "displacement amount of the load detection point when the piston 6D is pressed by the hydraulic pressure". Then, if an insufficient or excessive clearance is generated, this may lead to dragging or a mechanical malfunction. Further, the variation in the clearance may lead to a variation in responsiveness at the time of the next application.

In light thereof, in the embodiment, a target release stroke amount is set to an amount acquired by adding a "stroke including an overshoot from a load detection point to an application operation completion point", a "stroke corresponding to a pad movement amount, deformation amount, and/or the like due to the hydraulic pressure", and a "target clearance". Due to that, the embodiment can improve the accuracy of controlling the clearance without being affected by a change in the voltage or the hydraulic pressure (the brake hydraulic pressure). As a result, the embodiment can stabilize the responsiveness at the time of the next application. Further, the embodiment can prevent an insufficient or excessive clearance from being generated, thereby preventing dragging or a mechanical malfunction.

In the following description, the braking control apparatus 17 according to the embodiment, more specifically, a portion in the braking control apparatus 17 that performs processing relating to the control of the electric brake (the electric motor 7A) (hereinafter, this portion will be referred to as a parking brake control apparatus 31) will be described with reference to FIGS. 4 to 23.

Figure 4:
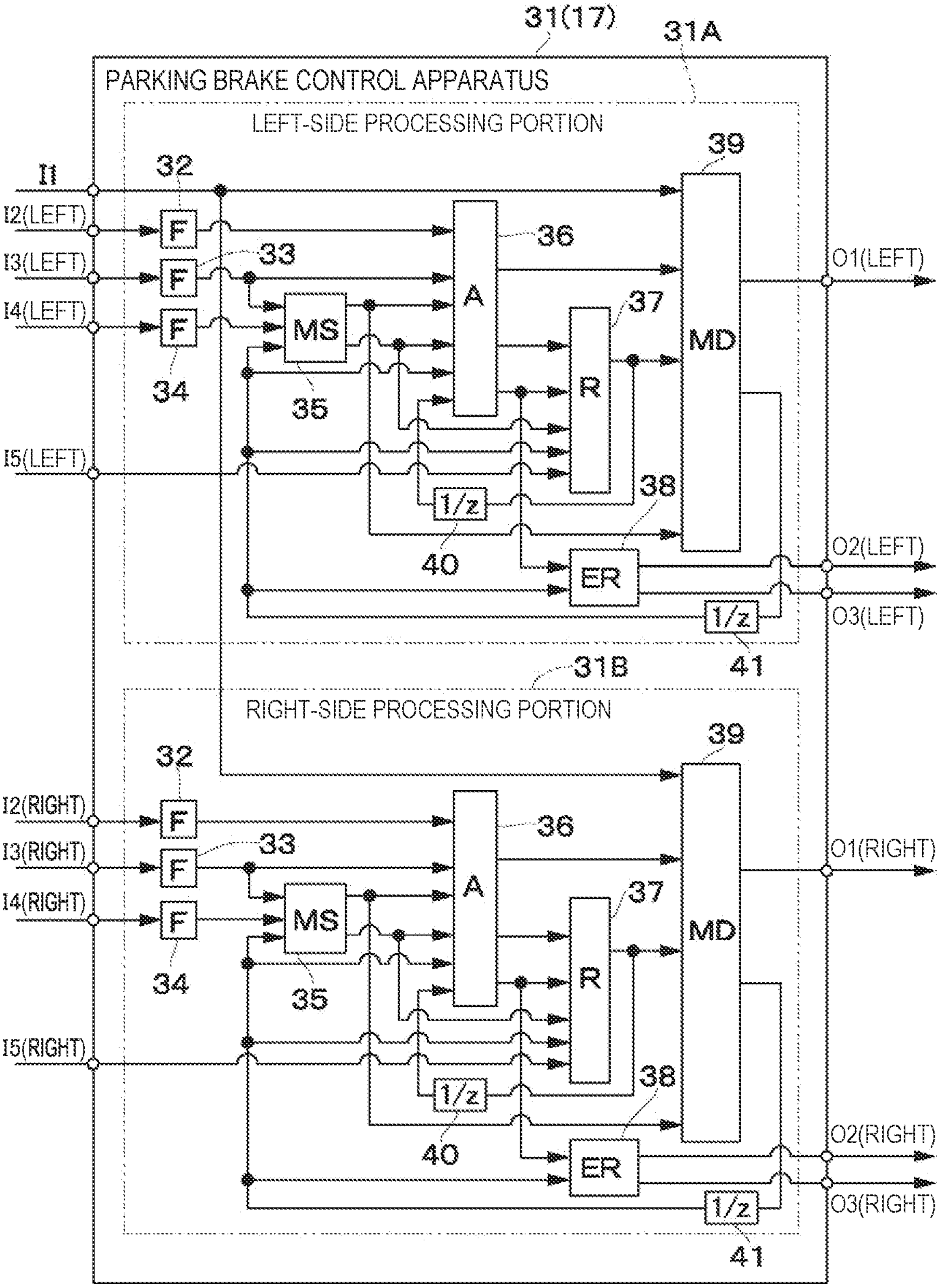
FIG. 4 is a block diagram (a control block diagram) illustrating the control apparatus illustrated in FIG. 1.

The parking brake control apparatus 31 as the electric brake control apparatus constitutes a part of the braking control apparatus 17. As illustrated in FIG. 4, the parking brake control apparatus 31 includes a left-side control portion 31A and a right-side control portion 31B. The left-side control portion 31A performs processing relating to the electric motor 7A located on the left side of the vehicle body 1. The right-side control portion 31B performs processing relating to the electric motor 7A located on the right side of the vehicle body 1. The left-side control portion 31A and the right-side control portion 31B are similarly configured except for the difference that they are the left side and the right side, and therefore will be described in the following description mainly focusing on the left-side control portion 31A, and omitting the description of the right-side control portion 31B while identifying components thereof corresponding to the left-side control portion 31A by the same reference numerals as the left-side control portion 31A.

Figure 5:
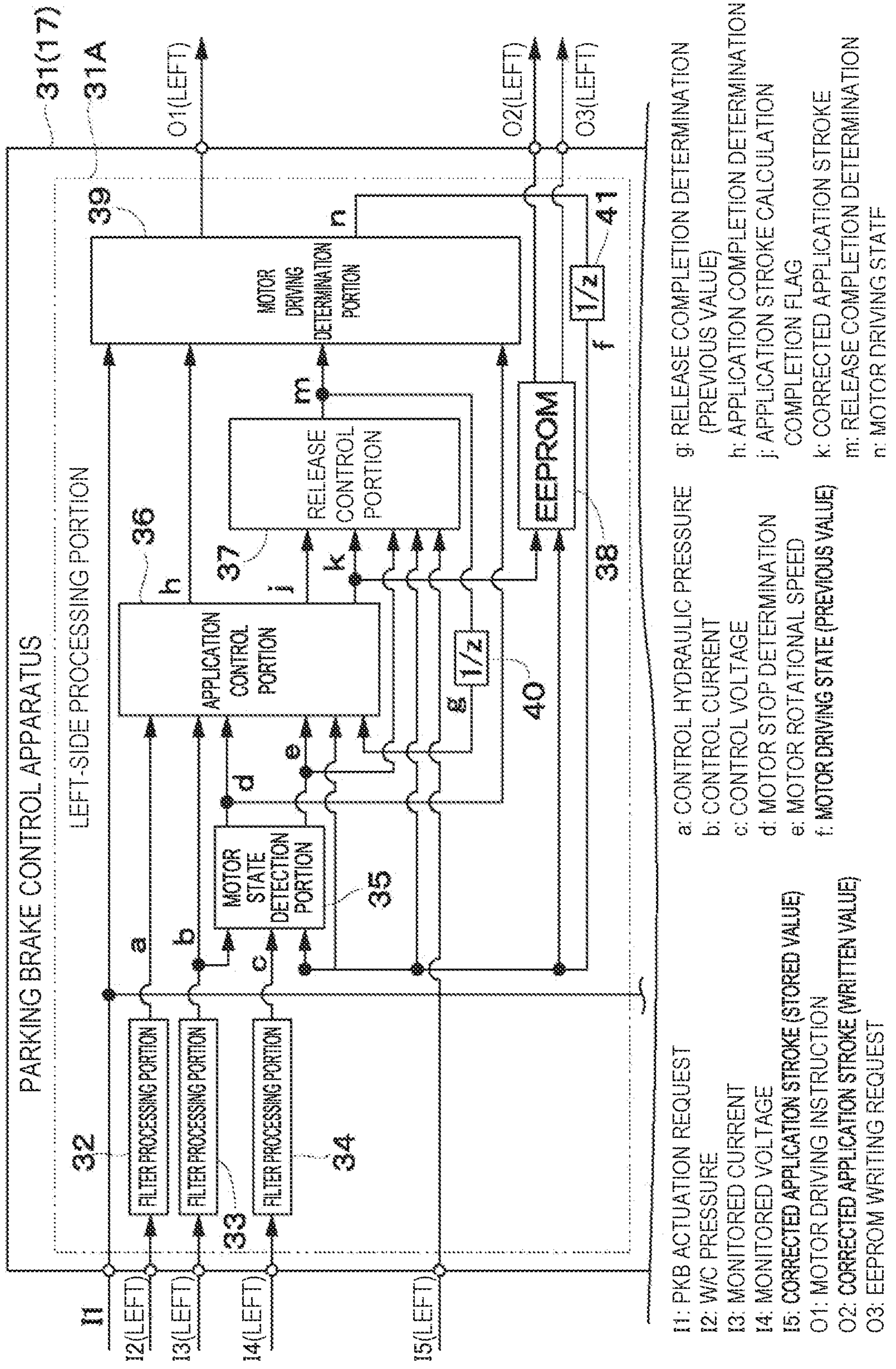
FIG. 5 is a block diagram illustrating a left-side processing portion of the control apparatus illustrated in FIG. 4.

FIGS. 4 and 5 illustrate the overall control configuration according to the embodiment. The control configuration mainly includes five control blocks (a motor state calculation portion 35, an application control portion 36, a release control portion 37, an EEPROM portion 38, and a motor driving determination portion 39), and performs the same control on the left side and the right side. However, driving the electric motors 7A and 7A on the left side and the right side at the same time leads to the generation of a considerable electric load, and therefore the electric motors 7A and 7A are preferably driven at timings different between the left side and the right side. In other words, the timings of starting driving the electric motors 7A and 7A are preferably desynchronized (for example, desynchronized by approximately several tens of milliseconds) between the left side and the right side to prevent a voltage drop due to an overlap of the inrush currents on the left side and the right side.

Further, the present control configuration is intended to be used for the application and the release in a state that the vehicle is stopped (i.e., a static application and a static release), but is applicable to any function in which a stroke amount at the time of an application can be estimated, such as an application and a release in a state that the vehicle is running (i.e., a dynamic application and a dynamic release). Further, for example, the present control configuration is also applicable to even a function actuated according to a request from the vehicle system side such as a parking holding function on a hill or the like instead of an operation on the parking brake switch 23, as long as a stroke amount at the time of an application can be estimated in this function. Further, the embodiment will be described citing the hydraulic disk brake equipped with the electric parking brake function as an example of the electric brake, but the electric brake is not limited thereto and, for example, an electric disk brake including an electric caliper or an electric drum brake may be used as the electric brake.

As illustrated in FIGS. 4 and 5, the parking brake control apparatus 31 (the left-side control portion 31A and the right-side control portion 31B) includes filter processing portions 32, 33, and 34, the motor state calculation portion 35, the application control portion 36, the release control portion 37, the EEPROM portion 38, the motor driving determination portion 39, and 1/z portions 40 and 41. The processing is performed every predetermined control cycle, such as a cycle of 10 ms in each block in the present control configuration. Further, the processing is performed for the left side first and the right side next. Therefore, when an output signal of a right-side block is input to a left-side block, such a block is indicated as a block "1/z", i.e., the 1/z portions 40 and 41 to express that a value calculated in the previous task (control cycle) is directly used in the present task.

A sensor signal corresponding to the W/C pressure from the W/C pressure sensor 21, a sensor signal corresponding to the current (the monitored current) from the current sensor portion 29, and a sensor signal corresponding to the voltage (the monitored voltage) from the voltage sensor portion 30 are input to the filter processing portions 32, 33, and 34, respectively. The filter processing portions 32, 33, and 34 perform filtering processing on the respective sensor signals. The filtering processing is assumed to be a time constant not causing a delay behind a noise amplitude and the control cycle.

The filter processing portion 32, which performs the filtering processing on the input signal (the W/C pressure) fed from the W/C pressure sensor 21, outputs a signal resulting from the filtering processing to the application control portion 36 as a control hydraulic pressure. The filter processing portion 33, which performs the filtering processing on the input signal (the monitored current) fed from the current sensor portion 29, outputs a signal resulting from the filtering processing to the application control portion 36 and the motor state calculation portion 35 as a control current. The filter processing portion 34, which performs the filtering processing on the input signal (the monitored voltage) fed from the voltage sensor portion 30, outputs a signal resulting from the filtering processing to the motor state calculation portion 35 as a control voltage.

The monitored current and the monitored voltage subjected to the filtering processing are input to the motor state calculation portion 35 as the control current and the control voltage, respectively. The motor state calculation portion 35 calculates a motor rotational speed and also determines whether the motor is stopped based on the control current (a current value) and the control voltage (a voltage value). The motor state calculation portion 35 outputs a motor stop determination (ON or OFF), which is a result of determining whether the motor is stopped, to the application control portion 36 and the motor driving determination portion 39. Further, the motor state calculation portion 35 outputs the calculated motor rotational speed to the application control portion 36 and the release control portion 37.

The control hydraulic pressure, the control current value, the motor stop determination, the motor rotational speed, a motor driving state (a previous value), and a release completion determination (a previous value) are input to the application control portion 36. The application control portion 36 calculates a "stroke amount when the load detection point is displaced according to the advancement of the piston 6D accompanying the generation of a W/C pressure due to a driver's operation or the like (a correction value)" and a "stroke amount from the load detection point including an overshoot occurring since the application is completed in terms of the control until the motor is actually stopped (an application stroke)" based on these inputs. Further, the application control portion 36 determines whether the application is completed. The application control portion 36 outputs an application completion determination (ON or OFF), which is a result of determining whether the application is completed, to the motor driving determination portion 39. The application control portion 36 outputs an application stroke calculation completion flag (ON or OFF) corresponding to whether the calculation of the application stroke is completed to the release control portion 37. The application control portion 36 outputs a corrected application stroke acquired by adding the correction value and the application stroke to the release control portion 37 and the EEPROM portion 38.

The application stroke calculation completion flag, the corrected application stroke, the motor rotational speed, the motor driving state (the previous value), and the corrected application stroke (a stored value) are input to the release control portion 37. The release control portion 37 sets a stroke acquired by adding the "target clearance" to the corrected application stroke (=the correction value+the application stroke) as a target stroke at the time of the release (=the correction value+the application stroke+the target clearance). This prevents a variation in the clearance. The release control portion 37 outputs a release completion determination (ON or OFF), which is a result of determining whether the release is completed, to the motor driving determination portion 39 and the 1/z portion 40.

The corrected application stroke and the motor driving state (the previous value) are input to the EEPROM portion 38. For example, if a startup signal is switched to OFF between the application and the release, the target stroke calculated at the time of the application may be unable to be referred to. Therefore, the EEPROM portion 38 generates the corrected application stroke (the stored value) and an EEPROM writing request, and stores it into the nonvolatile memory. In other words, the EEPROM portion 38 outputs the EEPROM writing request and the corrected application stroke (the stored value), and writes the corrected application stroke into the memory 25 (the EEPROM). The memory 25 (the EEPROM) outputs the corrected application stroke (the written value) to the parking brake control apparatus 31 (the release control portion 37).

The signal from the parking brake switch 23, the request to actuate the electric brake (the electric parking brake) (the PKB actuation request) based on, for example, a signal derived from the determination of the automatic application/automatic release, the application completion determination, and the motor stop determination are input to the motor driving determination portion 39. The motor driving determination portion 39 generates an instruction instructing the motor driving circuit 28 to set the power supply to ON/OFF/shorting (a motor driving instruction) based on the PKB actuation request derived from a driver's operation or the like, and the application completion, release completion, or motor stop determination result. Further, the motor driving determination portion 39 generates the motor driving state. The motor driving determination portion 39 outputs the generated motor driving instruction to the motor driving circuit 28. Further, the motor driving determination portion 39 outputs the generated motor driving state to the 1/z portion 41.

The release completion determination is input to the 1/z portion 40. The 1/z portion 40 outputs the "release completion determination (the previous value)", which is the release completion determination as the previous value, to the application control portion 36. The motor driving state is input to the 1/z portion 41. The 1/z portion 41 outputs the "motor driving state (the previous value)", which is the motor driving state as the previous value, to the motor state calculation portion 35, the application control portion 36, the release control portion 37, and the EEPROM portion 38.

Figure 6:
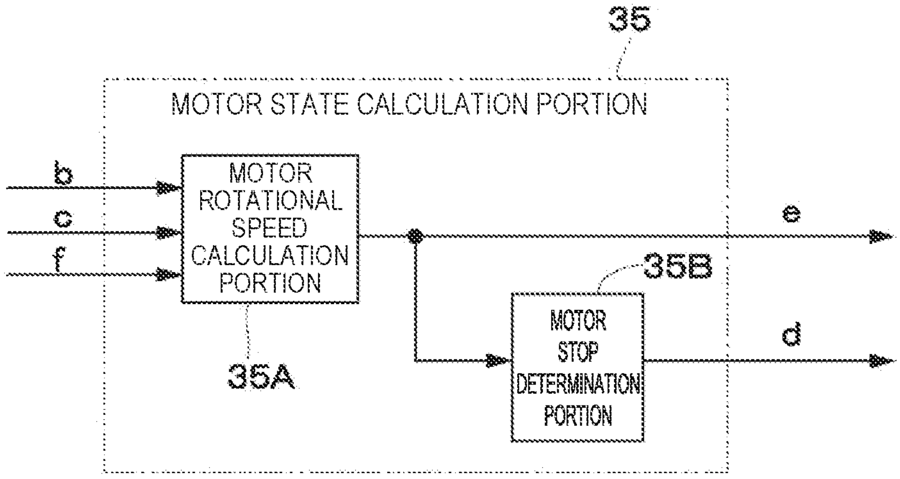
FIG. 6 is a block diagram illustrating a motor state calculation portion illustrated in FIG. 5.

Next, the motor state calculation portion 35 will be described with reference to FIGS. 6 and 7.

The motor state calculation portion 35 generates signals (the motor rotational speed and the motor stop determination) to be referred to by the application control portion 36, the release control portion 37, and the like, which will be described below. To fulfill this function, the motor state calculation portion 35 includes two blocks, i.e., a motor rotational speed calculation portion 35A and a motor stop determination portion 35B. The control current and the control voltage are input to the motor rotational speed calculation portion 35A. Further, the "motor driving state (the previous value)" is also input to the motor rotational speed calculation portion 35A. The motor rotational speed calculation portion 35A calculates the stroke at the time of the application/release and the motor rotational speed for use in the motor stop determination based on the current (the control current) and the voltage (the control voltage). More specifically, the motor rotational speed ω [rad/s] is calculated using the following equations 1 and 2. At the time of the application/release, the motor rotational speed is calculated using the equation 1 because the motor is driven based on the motor voltage. On the other hand, when the motor terminals are shorted to each other therebetween in the motor driving circuit 28 (the motor brake state), the motor voltage becomes zero and a current in the opposite direction is generated due to the inductive voltage, and therefore the motor slows down. Accordingly, the motor rotational speed is calculated using the equation 2. More specifically, the equation 1 corresponds to when the motor driving state is the "motor driving state (the previous value)"=an "application-ongoing state", a "release-ongoing state", or a "stopped state". The equation 2 corresponds to when the motor diving state is the "motor driving state (the previous value)"=a "motor brake-ongoing state after the application" or a "motor brake-ongoing state after the release".

$$\omega = \left(V - RI - L\frac{\Delta I}{\Delta t}\right)/ke \quad \text{[Equation 1]}$$

$$\omega = \left(RI + L\frac{\Delta I}{\Delta t}\right)/ke \quad \text{[Equation 2]}$$

In the equations 1 and 2, "V" represents a voltage [V] between the motor terminals, "R" represents a circuit resistance [Ω], "I" represents a motor current [A], "L" represents an inductance [H], "ΔI" represents a current change amount [A] (the present value–the previous value), "Δt" represents the control cycle, and "ke" represents an inductive voltage constant [V/(rad/s)]. The circuit resistance R [Ω] is a total resistance of the circuit starting from a position at which the voltage between the motor terminals is monitored and including the electric motor 7A. The calculation of the motor rotational speed ω [rad/s] may be, for example, a calculation of a motor rotational amount using a Hall sensor or the like. Further, the torque constant and the resistance between the terminals may be estimated based on the current and the voltage immediately after the motor is started up.

The motor rotational speed calculation portion 35A outputs the calculated motor rotational speed ω [rad/s] to the application control portion 36, the release control portion 37, and the motor stop determination portion 35B. The motor stop determination portion 35B determines whether the electric motor 7A is stopped to cause the driving state of the electric motor 7A to transition from the motor brake to the stop. The motor stop determination, which is a result of determining whether the electric motor 7A is stopped (ON: stopped or OFF: not stopped), is used to generate the state transition of the parking brake (the electric brake) and calculate the application stroke by the application control portion 36. If determining that the electric motor 7A is kept in a state that the motor rotational speed is equal to or lower than a speed threshold value for a predetermined time, the motor stop determination portion 35B sets the motor stop determination to ON.

Figure 7:
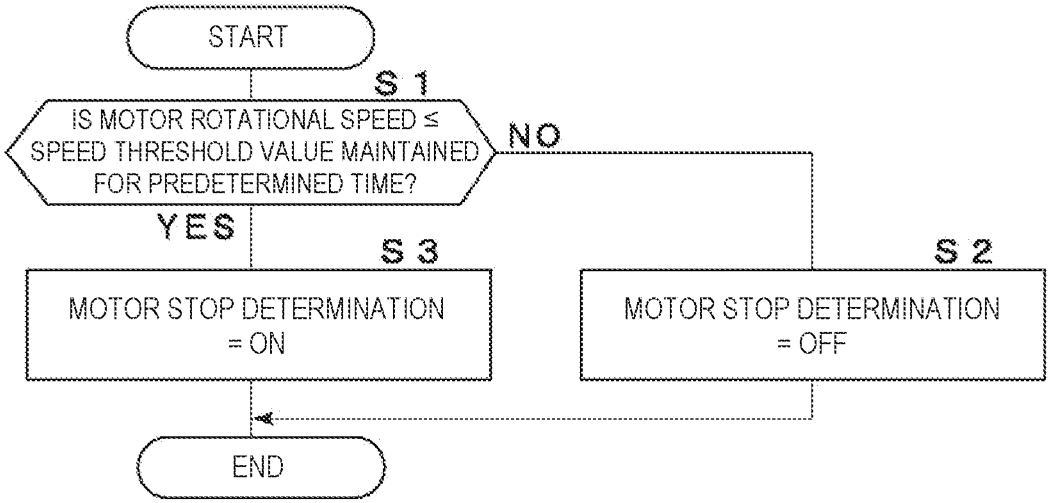
FIG. 7 is a flowchart illustrating processing performed by a motor stop determination portion illustrated in FIG. 6 (motor stop determination processing).

FIG. 7 illustrates processing for determining the motor stop that is performed by the motor stop determination portion 35B. The processing illustrated in FIG. 7 is repeatedly performed every predetermined control cycle (for example, 10 ms). When the processing illustrated in FIG. 7 is started, in S1, the motor stop determination portion 35B determines whether the electric motor 7A is kept in the state that the motor rotational speed is equal to or lower than the speed threshold value for the predetermined time. The speed threshold value can be set as a determination value for the rotational speed to allow the motor stop determination portion 35B to accurately determine whether the electric motor 7A is stopped. If "NO" is determined in S1, i.e., the motor rotational speed is determined to be equal to or higher than the speed threshold value, or the electric motor 7A is determined to be in the state that the motor rotational speed is equal to or lower than the speed threshold value but not to be kept in this state for the predetermined time, the processing proceeds to S2.

In S2, the motor stop determination is set to "OFF". "OFF" corresponds to that the "electric motor 7A is not stopped (is driven)". After the motor stop determination is set to "OFF" in S2, the processing proceeds to END. If "YES" is determined in S1, i.e., the electric motor 7A is determined to be kept in the state that the motor rotational speed is equal to or lower than the threshold value for the predetermined time, the processing proceeds to S3. In S3, the motor stop determination is set to "ON". "ON" corresponds to that the "electric motor 7A is stopped". After the motor stop determination is set to "ON" in S2, the processing proceeds to END. The motor stop determination portion 35B uses the rotational speed to determine the motor stop, but, for example, may determine whether the electric motor 7A is stopped based on the voltage and the current applied to the electric motor 7A.

Next, the application control portion 36 will be described with reference to FIGS. 8 to 14.

The application control portion 36 determines whether a braking force required to stop the vehicle is generated, and completes the application. Further, the application control portion 36 calculates the stroke amount generated when the piston 6D advances according to the generation of a WC pressure due to a driver's operation and the load detection point is displaced (the correction value), and the stroke amount from the load detection point including the overshoot occurring since the application is completed in terms of the control until the motor is actually stopped (the application stroke). To fulfill this function, the application control portion 36 includes five blocks, i.e., a load detection signal calculation portion 36A, a correction value calculation portion 36B, an application stroke calculation portion 36C, a corrected application stroke calculation portion 36D, and an application completion determination portion 36E.

The control current and the motor driving state (the previous value) are input to the load detection signal calculation portion 36A. The load detection signal calculation portion 36A detects a load on the electric motor 7A based on the control current and the motor driving state (the previous value). In other words, the load detection signal calculation portion 36A detects a point at which the rotation-linear motion conversion mechanism 8 (the linear motion member 8A2) abuts against the piston 6D and the load starts increasing (the load detection point) using the current (the control current). The load detection signal calculation portion 36A outputs a detection result, i.e., a signal corresponding to whether the load is detected to the correction value calculation portion 36B and the application stroke calculation portion 36C as a load detection signal (ON or OFF).

The control hydraulic pressure, the release completion determination (the previous value), the motor driving state (the previous value), and the load detection signal are input to the correction value calculation portion 36B. The correction value calculation portion 36B calculates a stroke amount according to the displacement of the load detection point due to the piston 6D being pressed by the hydraulic pressure (a change amount of the application stroke) as the correction value of the stroke based on these inputs. In other words, the correction value calculation portion 36B calculates a stroke corresponding to the displacement of the load detection point due to the piston 6D being pressed by the hydraulic pressure (the correction value). The correction value calculation portion 36B outputs the calculated correction value (the correction value of the application stroke) to the corrected application stroke calculation portion 36D.

The load detection signal, the motor driving state (the previous value), the motor stop determination, and the motor rotational speed are input to the application stroke calculation portion 36C. The application stroke calculation portion 36C calculates the application stroke, which is the stroke from the load detection point with the overshoot also reflected therein. In other words, the application stroke calculation portion 36C calculates the application stroke from the load detection point while reflecting therein the overshoot occurring until the electric motor 7A is completely stopped after the application is completed. The application stroke calculation portion 36C outputs the calculated application stroke to the corrected application stroke calculation portion 36D and the application completion determination portion 36E. Further, the application stroke calculation portion 36C outputs the application stroke calculation completion flag (ON or OFF) corresponding to whether the calculation of the application stroke is completed to the release control portion 37.

The correction value and the application stroke are input to the corrected application stroke calculation portion 36D. The corrected application stroke calculation portion 36D adds the correction value and the application stroke, thereby calculating the corrected application stroke corresponding to a stroke by which the piston should be returned at the time of the release. In other words, the corrected application stroke calculation portion 36D adds the correction value and the application stroke, thereby calculating the corrected application stroke for calculating the stroke by which the piston should be returned at the time of the release. The corrected application stroke calculation portion 36D outputs the calculated corrected application stroke to the release control portion 37 and the EEPROM portion 38. The application stroke, the motor driving state (the previous value), and the control current are input to the application completion determination portion 36E. The application completion determination portion 36E determines whether a predetermined thrust force is generated, i.e., whether the application is completed based on the current and the application stroke. The application completion determination portion 36E outputs a result of determining whether the application is completed to the motor driving determination portion 39 as the application completion determination.

Next, the load detection signal calculation portion 36A will be described with reference to FIG. 9.

The load detection signal calculation portion 36A calculates a timing at which the rotation-linear motion conversion mechanism 8 (the linear motion member 8A2) abuts against the piston 6D and the piston 6D starts moving during the application as the load detection. FIG. 9 illustrates processing for calculating the load detection signal that is performed by the load detection signal calculation portion 36A. The processing illustrated in FIG. 9 is repeatedly performed every predetermined control cycle (for example, 10 ms).

Figure 9:
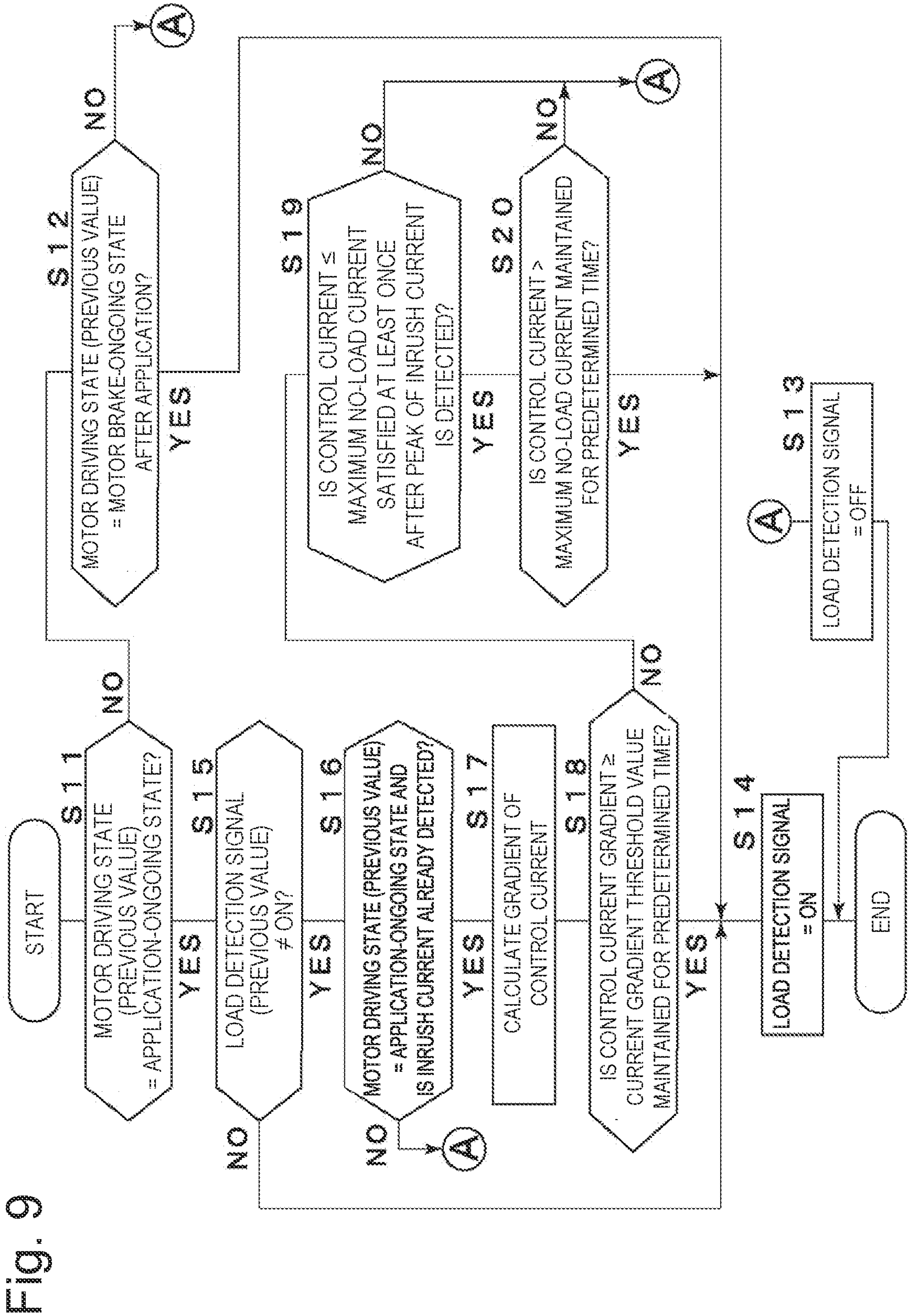
FIG. 9 is a flowchart illustrating processing performed by a load detection signal calculation portion illustrated in FIG. 8 (load detection signal calculation processing).

After the processing illustrated in FIG. 9 is started, in S11, the load detection signal calculation portion 36A determines whether the motor driving state (the previous value) is the application-ongoing state. The motor driving state (the previous value) is input from the motor driving determination portion 39 to the load detection signal calculation portion 36A via the l/z portion 41. If "NO" is determined in S11, i.e., the motor driving state (the previous value) is determined not to be the application-ongoing state, the processing proceeds to S12. In S12, the load detection signal calculation portion 36A determines whether the motor driving state (the previous value) is the motor brake-ongoing state after the application.

If "NO" is determined in S12, i.e., the motor driving state (the previous value) is determined not to be the motor brake-ongoing state after the application, the processing proceeds to S13 via "A". In this case, the rotation-linear motion conversion mechanism 8 (the linear motion member 8A2) does not abut against the piston 6D and the piston 6D does not start moving because the motor driving state is neither the application-ongoing state nor the motor brake-ongoing state after the application. Therefore, in S13, the load detection signal is set to OFF. The load detection signal is a signal corresponding to a state value indicating whether the load due to the abutment of the rotation-linear motion conversion mechanism 8 (the linear motion member 8A2) against the piston 6D and the start of the movement of the piston 6D is detected (ON: the load is detected or OFF: the load is not detected). After the load detection signal is set to "OFF" in S13, the processing proceeds to END.

On the other hand, if "YES" is determined in S12, i.e., the motor driving state (the previous value) is determined to be the motor brake-ongoing state after the application, the processing proceeds to S14. In this case, it is considered that the rotation-linear motion conversion mechanism 8 (the linear motion member 8A2) already abuts against the piston 6D and the piston 6D starts moving because the motor driving state is the motor brake-ongoing state after the application. Therefore, in S14, the load detection signal is set to ON (is kept set to ON). After the load detection signal is set to "ON" in S14, the processing proceeds to END.

On the other hand, if "YES" is determined in S11, i.e., the motor driving state (the previous value) is determined to be the application-ongoing state, the processing proceeds to S15. In S15, the load detection signal calculation portion 36A determines whether the load detection signal (the previous value) is other than ON. If "NO" is determined in S15, i.e., the load detection signal (the previous value) is determined to be ON, the processing proceeds to S14, in which the load detection signal is set to ON (is kept set to ON). On the other hand, if "YES" is determined in S15, i.e., the load detection signal (the previous value) is determined to be other than ON, the processing proceeds to S16. In S16, the load detection signal calculation portion 36A determines whether the motor driving state (the previous value) is the application-ongoing state and the peak of the inrush current is detected. Whether the peak of the inrush current is detected can be determined (detected) based on, for example, whether the current reaches a current threshold value corresponding to the peak. If "NO" is determined in S16, i.e., the peak of the inrush current is determined not to be detected, the processing proceeds to S13 via "A".

On the other hand, if "YES" is determined in S16, i.e., the motor driving state is determined to be the application-ongoing state and the peak of the inrush current is determined to be detected, the processing proceeds to S17. In S17, the gradient of the control current is calculated. The control current is input from the current sensor portion 29 to the load detection signal calculation portion 36A via the filter processing portion 33. After the gradient of the control current is calculated in S17, the processing proceeds to S18.

In S18, the load detection signal calculation portion 36A determines whether the gradient of the control current is kept equal to or greater than a current gradient threshold value for a predetermined time. The current gradient threshold value and the predetermined time can be set as values (threshold values or determination values) that allow an accurate determination to be made with respect to a change (an increase) in the current value due to the abutment of the rotation-linear motion conversion mechanism 8 (the linear motion member 8A2) against the piston 6D and the start of the movement of the piston 6D.

If "NO" is determined in S18, i.e., the gradient of the control current is determined not to be kept equal to or greater than the current gradient threshold value for the predetermined time, it is considered to be highly likely that the rotation-linear motion conversion mechanism 8 (the linear motion member 8A2) does not abut against the piston 6D and the piston 6D does not start moving yet, and therefore the processing proceeds to S19. On the other hand, if "YES" is determined in S18, i.e., the gradient of the control current is determined to be kept equal to or greater than the current gradient threshold value for the predetermined time, it is considered that the rotation-linear motion conversion mechanism 8 (the linear motion member 8A2) abuts against the piston 6D and the piston 6D starts moving, and therefore the processing proceeds to S4, in which the load detection signal is set to ON.

In S19, the load detection signal calculation portion 36A determines whether the control current reaches a maximum no-load current at least once after the peak of the inrush current is detected. The maximum no-load current corresponds to the maximum value of a current generated under a predetermined load before the rotation-linear motion conversion mechanism 8 (the linear motion member 8A2) abuts against the piston 6D since the inrush current emerges when the electric motor 7A is started up. If "NO" is determined in S19, i.e., the control current is determined not to reach the maximum no-load current after the peak of the inrush current is detected, the processing proceeds to S13 via "A". If "YES" is determined in S19, i.e., the control current is determined to reach the maximum no-load current after the peak of the inrush current is detected, the processing proceeds to S20.

In S20, the load detection signal calculation portion 36A determines whether the electric motor 7A is kept in a state that the control current is higher than the maximum no-load current for a predetermined time. If "NO" is determined in S20, i.e., the electric motor 7A is determined not to be kept in the state that the control current is higher than the maximum no-load current for the predetermined time, the processing proceeds to S13 via "A". If "YES" is determined in S20, i.e., the electric motor 7A is determined to be kept in the state that the control current is higher than the maximum no-load current for the predetermined time, the processing proceeds to S14. In this case, the load detection signal is set to ON.

In this manner, the load detection signal calculation portion 36A sets the load detection signal to ON if the electric motor 7A is kept in the application state for the predetermined time before the load is detected and is kept in the state that the gradient of the control current is equal to or greater than the threshold value or the control current is higher than the maximum no-load current for the predetermined time. Further, the load detection signal calculation portion 36A performs mask processing intended to prevent false detection of the load due to the inrush current. In other words, the load detection signal calculation portion 36A masks the load detection processing based on the gradient of the current until the peak of the inrush current is detected during the application. Further, the load detection signal calculation portion 36A masks the load detection processing based on the current threshold value (the maximum no-load current) until the control current falls below the maximum no-load current after the peak is detected.

The robustness can be ensured by performing such mask processing. Regarding such two load detection processing procedures, the load detection signal calculation portion 36A may be configured to, for example, mask the load detection processing only for a predetermined time since the application driving is started as a simplified method. Further, after setting the load detection signal to ON, the load detection signal calculation portion 36A maintains the ON state as long as the motor driving state (the previous value) is the "motor brake-ongoing state after the application", and sets the load detection signal to OFF after the motor driving state (the previous value) transitions from the "motor brake-ongoing state after the application".

Next, the correction value calculation portion 36B will be described with reference to FIG. 10.

Figure 11:
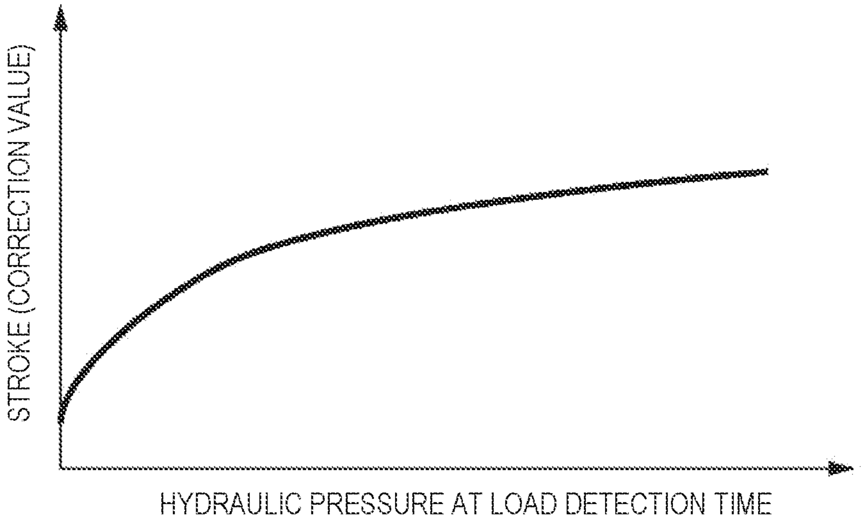
FIG. 11 is a characteristic line diagram representing one example of the relationship between a hydraulic pressure when a load is detected and a correction value of a stroke (a correction value calculation table).

The correction value calculation portion 36B calculates the pad movement amount and the pad deformation amount derived from the hydraulic pressure when the load is detected using a correction value calculation table illustrated in FIG. 11. The correction value is calculated as a value acquired by adding a piston movement amount as far as a position where a thrust force generated by the hydraulic pressure and a force working so as to return the piston 6D (a total reaction force of, for example, reaction forces due to a frictional force between the piston seal 6E and the piston 6D and a frictional force between the brake pad 6C and a shim) are balanced, and a piston movement amount due to stiffness deformation of the brake pad 6C. A stroke amount when the load detection point is determined may be calculated based on the motor rotational speed when the motor rotates under a constant load after the inrush current, and may be added to the correction value. In the present embodiment, as the brake hydraulic pressure increases, the piston is further moved toward the disk rotor side and therefore the pads are also further moved toward the disk rotor side while being deformed. Therefore, the application with the brake hydraulic pressure generated leads to an increase in the stroke performed as far as the load detection point compared with the application with no brake hydraulic pressure generated. In light thereof, the correction value, which is added to the application stroke when the corrected application stroke is calculated, is set so as to increase as the hydraulic pressure at the load detection point increases. In this manner, the correction value also increases as the hydraulic pressure increases in the configuration where the pads (the frictional member) are moved toward the disk rotor (friction receiving member) side due to the generation of a hydraulic pressure. On the other hand, the application with the brake hydraulic pressure generated leads to a reduction in the stroke performed as far as the load detection point compared with the application with no brake hydraulic pressure generated in a configuration where the frictional member is moved toward the opposite side from the friction receiving member, i.e., toward the parking brake mechanism side due to the generation of a brake hydraulic pressure. In light thereof, the correction value, which is added to the application stroke when the corrected application stroke is calculated, is set so as to reduce as the hydraulic pressure at the load detection point increases. In this manner, the characteristic of the correction value calculation table may be changed depending on an embodiment.

Figure 10:
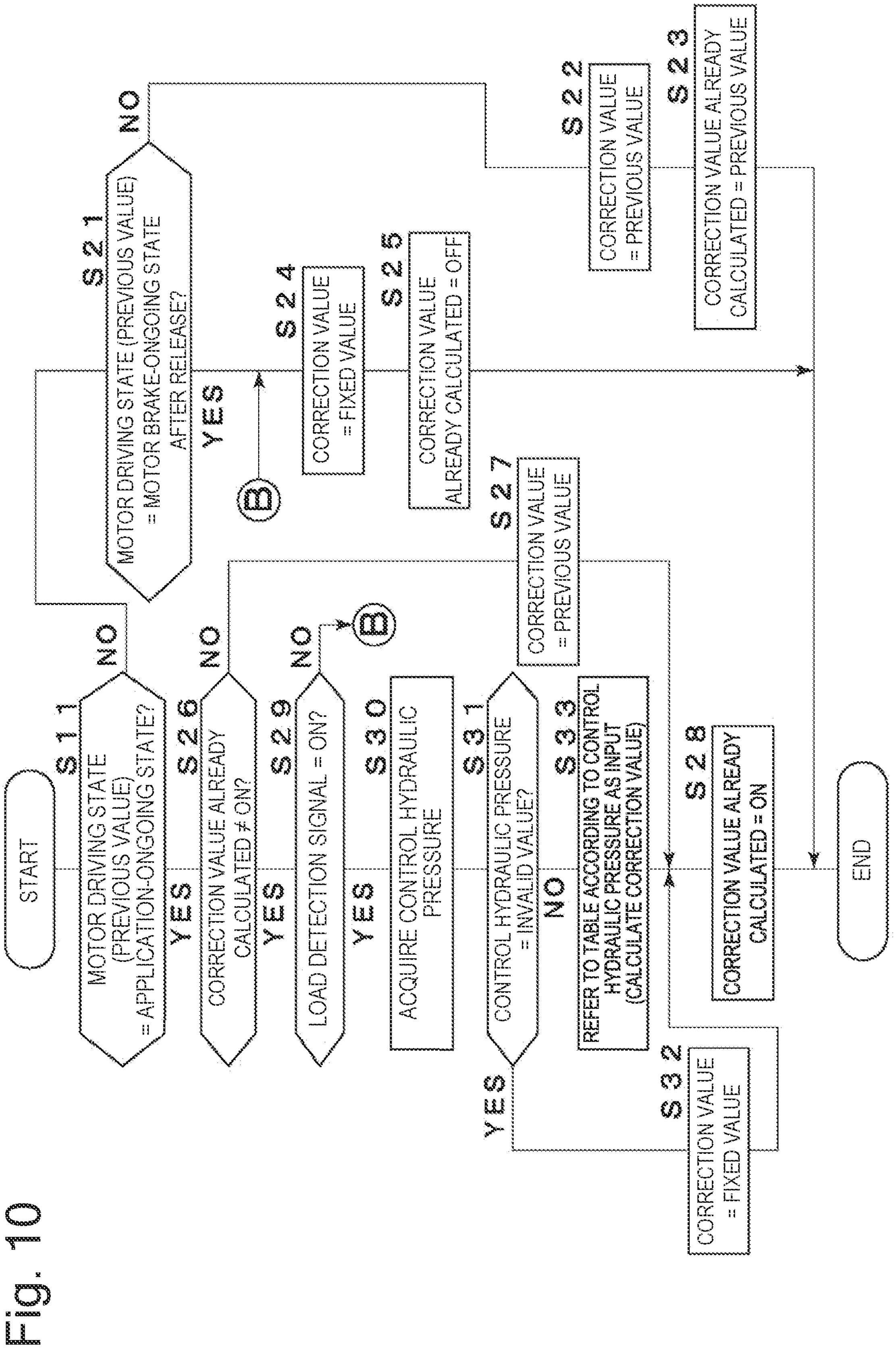
FIG. 10 is a flowchart illustrating processing performed by a correction value calculation portion illustrated in FIG. 8 (correction value calculation processing).

FIG. 10 illustrates processing for calculating the correction value that is performed by the correction value calculation portion 36B. The processing illustrated in FIG. 10 is repeatedly performed every predetermined control cycle (for example, 10 ms). After the processing illustrated in FIG. 10 is started, in S11, the correction value calculation portion 36B determines whether the motor driving state (the previous value) is the application-ongoing state, similarly to FIG. 9. The motor driving state (the previous value) is input from the motor driving determination portion 39 to the correction value calculation portion 36B via the l/z portion 41. If "NO" is determined in S11, i.e., the motor driving state (the previous value) is determined not to be the application-ongoing state, the processing proceeds to S21. In S21, the correction value calculation portion 36B determines whether the motor driving state (the previous value) is the motor brake-ongoing state after the release.

If "NO" is determined in S21, i.e., the motor driving state (the previous value) is determined not to be the motor brake-ongoing state after the release, the processing proceeds to S22 and S23. In S22, the "correction value" is set to the previous value. In S23, a "correction value already calculated" is set to the previous value. Then, the processing proceeds to END. The "correction value already calculated" corresponds to a state value indicating whether the correction value is already calculated (ON: already calculated or OFF: not yet calculated). On the other hand, if "YES" is determined in S21, i.e., the motor driving state (the previous value) is determined to be the motor brake-ongoing state after the release, the processing proceeds to S24 and S25. In S24, the "correction value" is set to a fixed value. In S25, the "correction value already calculated" is set to OFF. Then, the processing proceeds to END.

A value least likely to lead to dragging or a mechanical malfunction can be used as the fixed value basically based on a simulation or the like. For example, a maximum value in the correction table calculation table (FIG. 11) that corresponds to a maximum amount of the piston movement caused by the hydraulic pressure can be set as the fixed value. However, if a mechanical malfunction occurs according to an excessive return due to the use of the fixed value when no hydraulic pressure is generated actually (mechanically dependent), the fixed value should be a fixed value within a range not causing a mechanical malfunction. However, a fixed value within a range not causing a mechanical malfunction may be unable to be set depending on the device. In this case, the correction value may be calculated by, for example, estimating the WC pressure based on the relationship between the stroke amount from the application start to the load detection point and the MC pressure, and referring to the correction value calculation table according to the estimated WC pressure as an input.

On the other hand, if "YES" is determined in S11, i.e., the motor driving state (the previous value) is determined to be the application-ongoing state, the processing proceeds to S26. In S26, the correction value calculation portion 36B determines whether the correction value already calculated is other than ON (whether the current is OFF). If "NO" is determined in S26, i.e., the correction value already calculated is determined to be ON (the correction value is determined to be already calculated), the processing proceeds to S27 and S28. In S27, the "correction value" is set to the previous value. In S28, the "correction value already calculated" is set to ON. Then, the processing proceeds to END. On the other hand, if YES" is determined in S26, i.e., the correction value already calculated is determined to be other than ON (the correction value is determined not to be calculated yet), the processing proceeds to S29.

In S29, the correction value calculation portion 36B determines whether the load detection signal is ON. The load detection signal is input from the load detection signal calculation portion 36A to the correction value calculation portion 36B. If "NO" is determined in S29, i.e., the load detection signal is determined not to be ON, the processing proceeds to S24 and S25 via "B". On the other hand, if "YES" is determined in S29, i.e., the load detection signal is determined to be ON, the processing proceeds to S30, in which the control hydraulic pressure is acquired. The control hydraulic pressure is input from the W/C pressure sensor 21 to the correction value calculation portion 36B via the filter processing portion 32. After the control hydraulic pressure is acquired in S30, in S31, the correction value calculation portion 36B determines whether the control hydraulic pressure can be normally acquired, i.e., determines whether the control hydraulic pressure is an Invalid value (an inappropriate value). If "YES" is determined in S31, i.e., the control hydraulic pressure is determined to be an Invalid value, the processing proceeds to S32, in which the "correction value" is set to the fixed value. Then, the processing proceeds to S28, in which the "correction value already calculated" is set to ON.

On the other hand, if "NO" is determined in S31, i.e., the control hydraulic pressure is determined not to be an Invalid value, the processing proceeds to S33, in which the "correction value" is calculated. More specifically, the "correction value" is calculated according to the control hydraulic pressure at that time using the correction value calculation table illustrated in FIG. 11. In the correction value calculation table, the correction value increases as the hydraulic pressure (the brake hydraulic pressure) at the load detection point increases. After the correction value is calculated in S33, the processing proceeds to S28, in which the "correction value already calculated" is set to ON.

In this manner, the correction value calculation table 36B calculates the correction value using the correction value calculation table prepared as illustrated in FIG. 11. In this case, the load detection time corresponds to when the correction value already calculated is not ON and the load detection signal is ON, and therefore the correction value calculation portion 36B acquires the control hydraulic pressure at that time, and calculates the correction value using the correction value calculation table and sets the correction value already calculated=ON. Alternatively, if the control hydraulic pressure cannot be normally acquired (if the control hydraulic pressure is an Invalid value), the correction value calculation portion 36B sets the correction value to the fixed value without use of the correction value calculation table and sets the corrected value already calculated=ON.

On the other hand, before the load is detected, the correction value is not determined and therefore the correction value calculation portion 36B sets the correction value to the fixed value and sets the correction value already calculated=OFF. On the other hand, after the correction value is calculated (i.e., the correction value already calculated=ON), the correction value does not have to be updated, and therefore the correction value calculation portion 36B sets the correction value to the previous value and sets the correction value already calculated=OFF. The calculated correction value is held until the release is completed, and therefore the correction value calculation portion 36B keeps the correction value and the correction value already calculated set to the previous values until the motor driving state transitions to the "motor brake-ongoing state after the release", and switches the correction value to the fixed value and clears the correction value already calculated (sets it to OFF) when the motor driving state transitions to the "motor brake-ongoing state after the release".

Next, the application stroke calculation portion 36C % will be described with reference to FIG. 12.

The application stroke calculation portion 36C calculates the stroke amount (the application stroke) generated since the rotation-linear motion conversion mechanism 8 abuts against the piston 6D until the electric motor 7A is stopped. FIG. 12 illustrates processing for calculating the application stroke that is performed by the application stroke calculation portion 36C. The processing illustrated in FIG. 12 is repeatedly performed every predetermined control cycle (for example, 10 ms).

Figure 12:
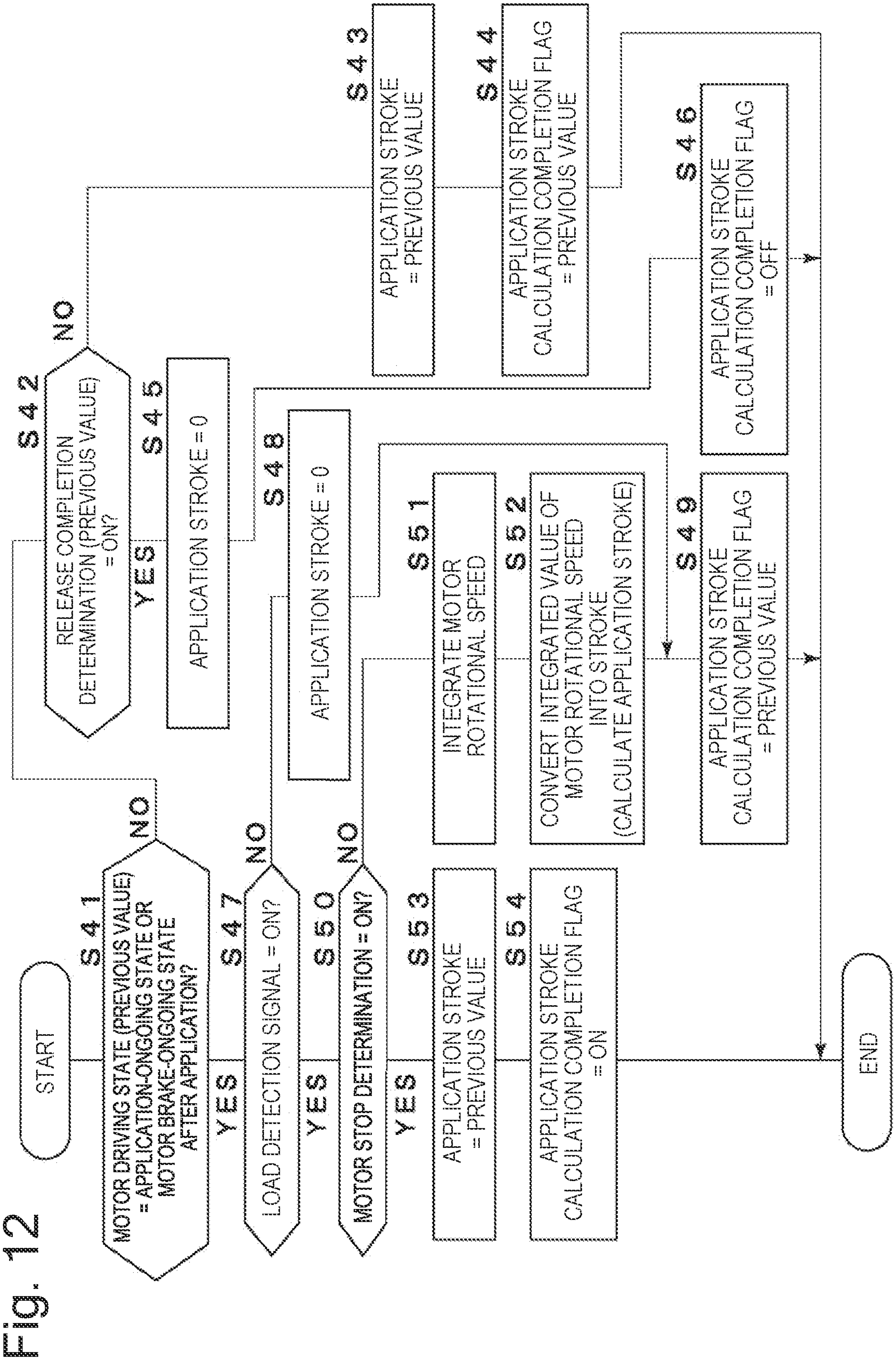
FIG. 12 is a flowchart illustrating processing performed by an application stroke calculation portion illustrated in FIG. 8 (application stroke calculation processing).

After the processing illustrated in FIG. 12 is started, in S41, the application stroke calculation portion 36C determines whether the motor driving state (the previous value) is the application-ongoing state or the motor brake-ongoing state after the application. The motor driving state (the previous value) is input from the motor driving determination portion 39 to the application stroke calculation portion 36C via the l/z portion 41. If "NO" is determined in S41, i.e., the motor driving state (the previous value) is determined to be neither the application-ongoing state nor the motor brake-ongoing state after the application, the processing proceeds to S42. In S42, the application stroke calculation portion 36C determines whether the release completion determination (the previous value) is ON. The release completion determination (the previous value) is input from the release control portion 37 to the application stroke calculation portion 36C via the l/z portion 40. If "NO" is determined in S42, i.e., the release completion determination (the previous value) is determined not to be ON, the processing proceeds to S43 and S44.

In S43, the "application stroke" is set to the previous value. In S44, the "application stroke calculation completion flag" is set to the previous value. Then, the processing proceeds to END. On the other hand, if "YES" is determined in S42, i.e., the release completion determination (the previous value) is determined to be ON, the processing proceeds to S45 and S46. In S45, the "application stroke" is set to "0". In S46, the "application stroke calculation completion flag" is set to "OFF". Then, the processing proceeds to END.

On the other hand, if "YES" is determined in S41, i.e., the motor driving state (the previous value) is determined to be the application-ongoing state or the motor brake-ongoing state after the application, the processing proceeds to S47. In S47, the application stroke calculation portion 36C determines whether the load detection signal is ON. The load detection signal is input from the load detection signal calculation portion 36A to the application stroke calculation portion 36C. If "NO" is determined in S47, i.e., the load detection signal is determined not to be ON, the processing proceeds to S48 and S49. In S48, the "application stroke" is set to "0". In S49, the "application stroke calculation completion flag" is set to the previous value. Then, the processing proceeds to END.

On the other hand, if "YES" is determined in S47, i.e., the load detection signal is determined to be ON, the processing proceeds to S50. In S50, the application stroke calculation portion 36C determines whether the motor stop determination is ON. The motor stop determination is input from the motor state calculation portion 35 (the motor stop determination portion 35B) to the application stroke calculation portion 36C. If "NO" is determined in S50, i.e., the motor stop determination is determined not to be ON, the processing proceeds to S51, in which the motor rotational speed is integrated. The motor rotational speed is input from the motor state calculation portion 35 (the motor rotational speed calculation portion 35A) to the application stroke calculation portion 36C. In subsequent S52, the application stroke is calculated by converting the integrated value of the motor rotational speed into a stroke. Then, the processing proceeds to S49.

On the other hand, if "YES" is determined in S50, i.e., the motor stop determination is determined to be ON, the processing proceeds to S53 and S54. In S53, the "application stroke" is set to the previous value. In S49, the "application stroke calculation completion flag" is set to "ON". Then, the processing proceeds to END.

In this manner, the application stroke calculation portion 36C calculates a result of integrating the motor rotational speed to convert the rotational speed into the stroke as the application stroke if the load detection signal is switched to ON and the motor stop determination is not ON while the motor driving state (the previous value) is the "application-ongoing state" or the "motor brake-ongoing state after the application". On the other hand, when the motor stop determination is switched to ON, the application stroke calculation portion 36C sets the application stroke to the previous value and switches the application stroke calculation completion flag to ON. Further, until the load detection signal is switched to ON, the application stroke calculation portion 36C keeps the application stroke at zero because the rotation-linear motion conversion mechanism 8 (the linear motion member 8A2) does not abut against the piston 6D. Until the release is completed after the application stroke is calculated, the application stroke calculation portion 36C maintains the previous values for the application stroke and the application stroke calculation completion flag. After the release is completed, the application stroke calculation portion 36C clears the application stroke to zero and switches the application stroke calculation completion flag to OFF.

Next, the corrected application stroke calculation portion 36D will be described with reference to FIG. 13.

The corrected application stroke calculation portion 36D calculates the application stroke in which the correction amount due to the hydraulic pressure is reflected. FIG. 13 illustrates corrected application stroke calculation processing performed by the corrected application stroke calculation portion 36D. The processing illustrated in FIG. 13 is repeatedly performed every predetermined control cycle (for example, 10 ms).

Figure 13:
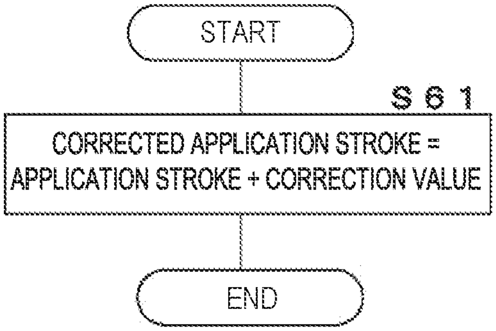
FIG. 13 is a flowchart illustrating processing performed by a corrected application stroke calculation portion illustrated in FIG. 8 (corrected application stroke calculation processing).

After the processing illustrated in FIG. 13 is started, in S61, the corrected application stroke calculation portion 36D calculates the corrected application stroke by adding the correction value to the application stroke. The application stroke is input from the application stroke calculation portion 36C to the corrected application stroke calculation portion 36D. The correction value is input from the correction value calculation portion 36B to the corrected application stroke calculation portion 36D. After the corrected application stroke is calculated in S61, the processing proceeds to END. In this manner, the corrected application stroke calculation portion 36D calculates a result of adding the correction value calculated by the correction value calculation portion 36B to the application stroke calculated by the application stroke calculation portion 36C as the corrected application stroke.

Next, the application completion determination portion 36E will be described with reference to FIG. 14.

The application completion determination portion 36E determines that a braking force required to stop the vehicle is generated and the application is completed. FIG. 14 illustrates application completion determination processing performed by the application completion determination portion 36E. The processing illustrated in FIG. 14 is repeatedly performed every predetermined control cycle (for example, 10 ms).

Figure 14:
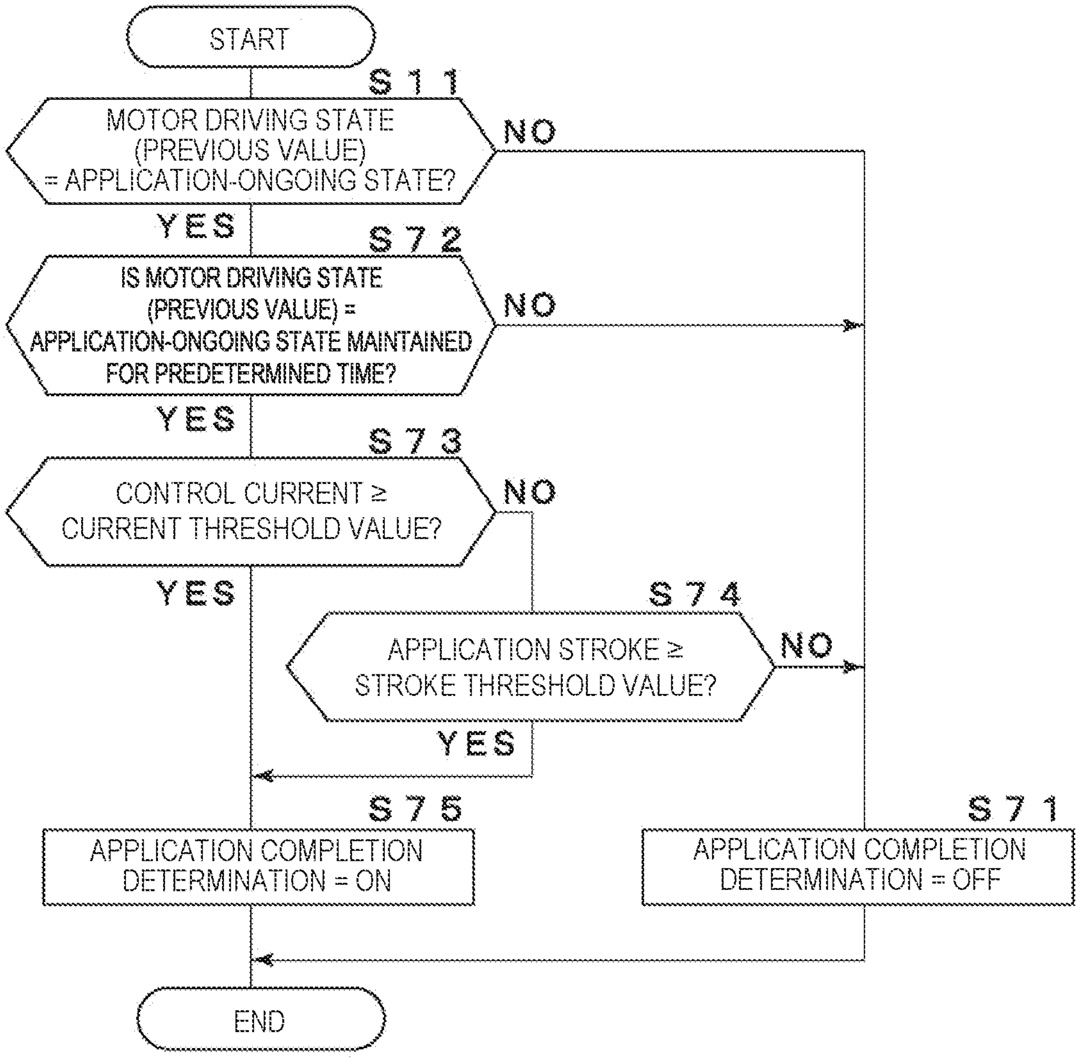
FIG. 14 is a flowchart illustrating processing performed by an application completion determination portion illustrated in FIG. 8 (application completion determination processing).
Figure 15:
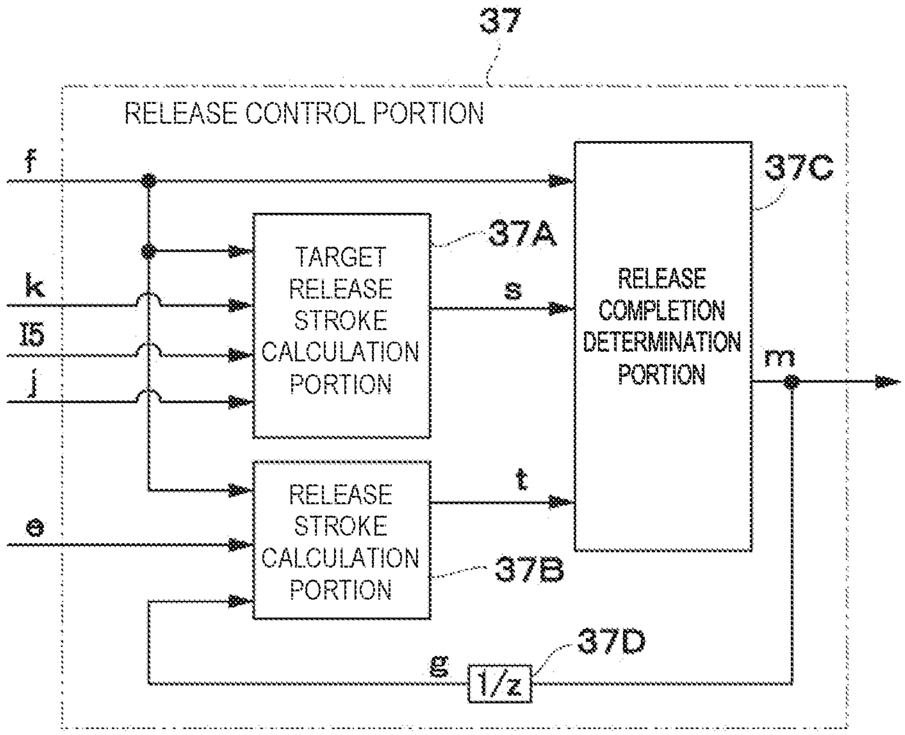
FIG. 15 is a block diagram illustrating a release control portion illustrated in FIG. 5.

After the processing illustrated in FIG. 14 is started, in S11, the application completion determination portion 36E determines whether the motor driving state (the previous value) is the application-ongoing state, similarly to FIGS. 9 and 10. The motor driving state (the previous value) is input from the motor driving determination portion 39 to the application completion determination portion 36E via the l/z portion 41. If "NO" is determined in S11, i.e., the motor driving state (the previous value) is determined not to be the application-ongoing state, the processing proceeds to S71. In S71, the application completion determination is set to "OFF". Then, the processing proceeds to END. The application completion determination corresponds to a result of determining whether the application is completed (ON: the application is completed or OFF: the application is not completed).

On the other hand, if "YES" is determined in S11, i.e., the motor driving state (the previous value) is determined to be the application-ongoing state, the processing proceeds to S72. In S72, the application completion determination portion 36E determines whether the motor driving state (the previous value) is the application-ongoing state and this state continues for a predetermined or longer time. If "NO" is determined in S72, i.e., the application-ongoing state is determined not to continue for the predetermined or longer time, the processing proceeds to S71. If "YES" is determined in S72, i.e., the application-ongoing state is determined to continue for the predetermined or longer time, the processing proceeds to S73. In S73, the application completion determination portion 36E determines whether the control current is equal to or higher than a current threshold value. The control current is input from the current sensor portion 29 to the application completion determination portion 36E via the filter processing portion 33. The current threshold value can be set as a current value (a determination value or a threshold value) that allows the application completion determination portion 36E to determine that a braking force required to stop the vehicle is generated when the current reaches or exceeds this value.

If "NO" is determined in S73, i.e., the control current is determined not to be equal to or higher than the current threshold value, the processing proceeds to S74. In S74, the application completion determination portion 36E determines whether the application stroke is equal to or greater than a stroke threshold value. The application stroke is input from the application stroke calculation portion 36C to the application completion determination portion 36E. The stroke threshold value can be set as a stroke value (a determination value or a threshold value) that allows the application completion determination portion 36E to determine that a braking force required to stop the vehicle is generated when the application stroke reaches or exceeds this value. If "NO" is determined in S74, i.e., the application stroke is determined not to be equal to or greater than the stroke threshold value, the processing proceeds to S71.

On the other hand, if "YES" is determined in S73, i.e., the control current is determined to be equal to or higher than the current threshold value or if "YES" is determined in S74, i.e., the application stroke is determined to be equal to or greater than the stroke threshold value, the processing proceeds to S75. In S75, the application completion determination is set to ON. Then, the processing proceeds to END.

In this manner, when the motor driving state (the previous value) is kept set to the "application-ongoing state" for the predetermined time and the control current reaches or exceeds the threshold value or the application stroke reaches or exceeds the threshold value, the application completion determination portion 36E determines that the application is completed and switches the application completion determination to ON. On the other hand, if the application state does not continue for the predetermined time and both the control current and the application stroke are lower or shorter than the threshold values, the application completion determination portion 36E sets the application completion determination to OFF. Then, after the motor driving state (the previous value) transitions from the "application-ongoing state", the application completion determination portion 36E switches the application completion determination to OFF.

Next, the release control portion 37 will be described with reference to FIGS. 15 to 18.

The release control portion 37 includes three blocks, i.e., a target release stroke calculation portion 37A, a release stroke calculation portion 37B, and a release completion determination portion 37C to secure a stable clearance. Further, the release control portion 37 includes a l/z portion 37D. The motor driving state (the previous value), the corrected application stroke, the corrected application stroke (the stored value), and the application stroke calculation completion flag are input to the target release stroke calculation portion 37A. The target release stroke calculation portion 37A determines which should be used, the "corrected application stroke stored in the nonvolatile memory" or the "corrected application stroke calculated in the same cycle" based on these inputs, and calculates a target release stroke by further adding a target clearance.

The same cycle means a period since the ECU (the braking control apparatus 17) is started up according to, for example, an operation of switching on the ignition SW until the ECU is powered off according to, for example, an operation of switching off the ignition SW and the reliability of the RAM information is lost. Therefore, for example, if the ignition SW is operated to be switched off by the time of the release after the application is completed, the reliability of the RAN information is lost and therefore the "corrected application stroke stored in the nonvolatile memory" is used. This means that the "corrected application stroke calculated in the same cycle" is used when the reliability of the RAM information is not lost until the release after the application is completed. The target release stroke calculation portion 37A outputs the calculated target release stroke to the release completion determination portion 37C.

The motor driving state (the previous value), the motor rotational speed, and the release completion determination (the previous value) are input to the release stroke calculation portion 37B. The release stroke calculation portion 37B calculates the stroke performed from the release start based on these inputs. In other words, the release stroke calculation portion 37B calculates the stroke amount generated since the release is started until the required clearance is secured. The release stroke calculation portion 37B outputs the calculated stroke to the release completion determination portion 37C as the release stroke.

The motor driving state (the previous value), the target release stroke, and the release stroke are input to the release completion determination portion 37C. The release completion determination portion 37C determines that the desired clearance is secured according to arrival of the release stroke at the target release stroke based on these inputs. The release completion determination portion 37C outputs the release completion determination, which is a result of the determination, to the motor driving determination portion 39 and the l/z portion 37D. The release completion determination is input to the l/z portion 37D. The l/z portion 37D outputs the "release completion determination (the previous value)", which is the release completion determination that is the previous value, to the release stroke calculation portion 37B.

Next, the release stroke calculation portion 37B will be described with reference to FIG. 16.

The release stroke calculation portion 37B calculates the stroke amount generated since the release is started until the required clearance is secured (the release stroke). FIG. 16 illustrates processing for calculating the release stroke that is performed by the release stroke calculation portion 37B. The processing illustrated in FIG. 16 is repeatedly performed every predetermined control cycle (for example, 10 ms).

Figure 16:
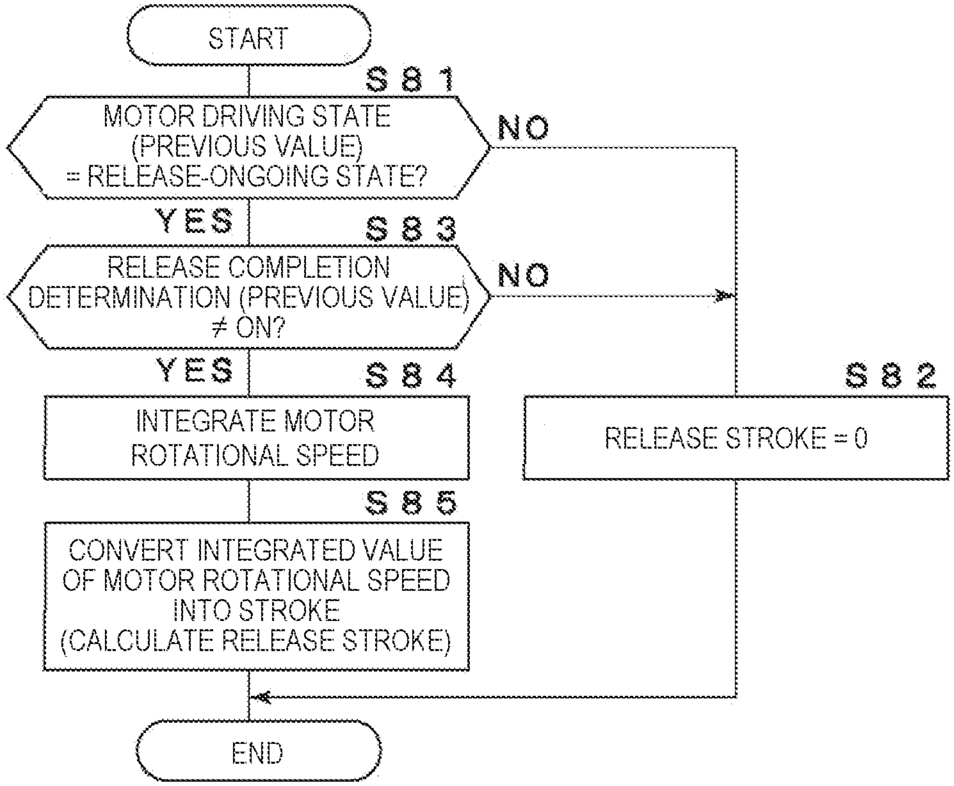
FIG. 16 is a flowchart illustrating processing performed by a release stroke calculation portion illustrated in FIG. 15 (release stroke calculation processing).

After the processing illustrated in FIG. 16 is started, in S81, the release stroke calculation portion 37B determines whether the motor driving state (the previous value) is the release-ongoing state. If "NO" is determined in S81, i.e., the motor driving state (the previous value) is determined not to be the release-ongoing state, the processing proceeds to S82. In S82, the release stroke is set to "0". Then, the processing proceeds to END. On the other hand, if "YES" is determined in S81, i.e., the motor driving state (the previous value) is determined to be the release-ongoing state, the processing proceeds to S83. In S83, the release stroke calculation portion 37B determines whether the release completion determination (the previous value) is other than ON.

The release completion determination (the previous value) is input from the release control portion 37 to the release stroke calculation portion 37B via the l/z portion 37D. If "NO" is determined in S83, i.e., the release completion determination (the previous value) is determined to be ON, the processing proceeds to S82. On the other hand, if "YES" is determined in S83, i.e., the release completion determination (the previous value) is determined to be other than ON, the processing proceeds to S84, in which the motor rotational speed is integrated. The motor rotational speed is input from the motor state calculation portion 35 (the motor rotational speed calculation portion 35A) to the release stroke calculation portion 37B. In subsequent S85, the release stroke is calculated by converting the integrated value of the motor rotational speed into a stroke. Then, the processing proceeds to END.

In this manner, the release stroke calculation portion 37B calculates the release stroke by integrating the motor rotational speed to convert it into the stroke when the motor driving state is the release-ongoing state with the release completion determination (the previous value)≠ON, to calculate the stroke performed since the release is started until the release completion is determined. Further, because the achievement of the release completion determination (the previous value)=ON during the release (the motor driving state (the previous value)=the release-ongoing state) means that the intended use of the present release stroke is satisfied, the release stroke calculation portion 37B switches the release stroke to zero. Further, because the stroke does not have to be calculated except during the release, the release stroke calculation portion 37B sets the release stroke to zero.

Next, the target release stroke calculation portion 37A will be described with reference to FIG. 17.

The target release stroke calculation portion 37A calculates the target release stroke required to secure the clearance at the time of the release. FIG. 17 illustrates processing for calculating the release stroke that is performed by the target release stroke calculation portion 37A. The processing illustrated in FIG. 17 is repeatedly performed every predetermined control cycle (for example, 10 ms).

Figure 17:
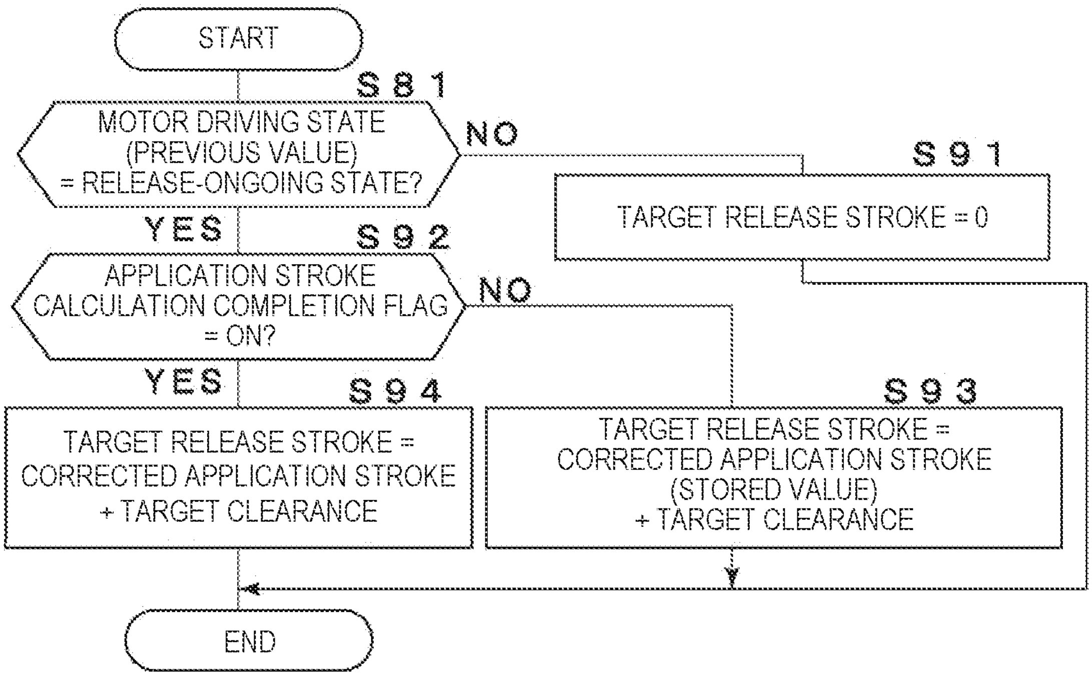
FIG. 17 is a flowchart illustrating processing performed by a target release stroke calculation portion illustrated in FIG. 15 (target release stroke calculation processing).

After the processing illustrated in FIG. 17 is started, in S81, the target release stroke calculation portion 37A determines whether the motor driving state (the previous value) is the release-ongoing state, similarly to FIG. 16. If "NO" is determined in S81, i.e., the motor driving state (the previous value) is determined not to be the release-ongoing state, the processing proceeds to S91. In S91, the target release stroke is set to "0". Then, the processing proceeds to END. On the other hand, if "YES" is determined in S81, i.e., the motor driving state (the previous value) is determined to be the release-ongoing state, the processing proceeds to S92. In S92, the target release stroke calculation portion 37A determines whether the application stroke calculation completion flag is ON. The application stroke calculation completion flag is input from the application control portion 36 (the application stroke calculation portion 36C) to the target release stroke calculation portion 37A.

If "NO" is determined in S92, i.e., the application stroke calculation completion flag is determined not to be ON, the processing proceeds to S93. In S93, the target release stroke is calculated by adding the corrected application stroke (the stored value) and the target clearance. The corrected application stroke (the stored value) corresponds to the corrected application stroke calculated by the application control portion 36 (the corrected application stroke calculation portion 36D) and written in the memory 25 (the EEPROM). The target clearance corresponds to, for example, a stroke amount as large as a space (clearance) required between the rotation-linear motion conversion mechanism 8 (the linear motion member 8A2) and the piston 6D from a position where the rotation-linear motion conversion mechanism 8 (the linear motion member 8A2) departs (separates) from the piston 6D (a position where the load is removed).

After the target release stroke is calculated in S93, the processing proceeds to END. On the other hand, if "YES" is determined in S92, i.e., the application stroke calculation completion flag is determined to be ON, the processing proceeds to S94. In S94, the target release stroke is calculated by adding the corrected application stroke and the target clearance. The corrected application stroke corresponds to the corrected application stroke calculated by the application control portion 36 (the corrected application stroke calculation portion 36D). After the target release stroke is calculated in S94, the processing proceeds to END.

In this manner, the target release stroke calculation portion 37A sets the target release stroke to 0 because the release completion does not have to be determined except during the release. Further, the target release stroke calculation portion 37A determines whether the stored value in the nonvolatile memory should be used based on the application stroke calculation completion flag, which is switched to ON when the application stroke calculation is completed, because the target release stroke should also be calculated in a state that the startup signal is switched to OFF and the RAM value is reset after the application is completed. Further, the target release stroke is calculated by adding the corrected application stroke and the target clearance if the application stroke calculation completion flag is ON, or adding the corrected application stroke (the stored value) and the target clearance if the application stroke calculation completion flag is OFF.

Next, the release completion determination portion 37C will be described with reference to FIG. 18.

The release completion determination portion 37C determines that the release is completed in a state that the desired clearance is secured. FIG. 18 illustrates processing for determining the completion of the release that is performed by the release completion determination portion 37C. The processing illustrated in FIG. 18 is repeatedly performed every predetermined control cycle (for example, 10 ms).

Figure 18:
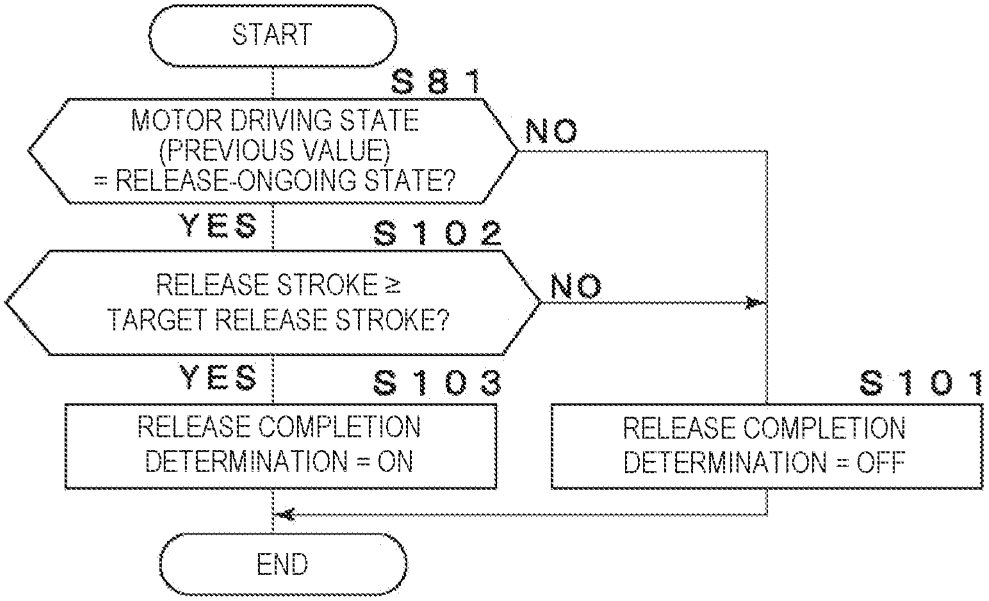
FIG. 18 is a flowchart illustrating processing performed by a release completion determination portion illustrated in FIG. 15 (release completion determination processing).

After the processing illustrated in FIG. 18 is started, in S81, the release completion determination portion 37C determines whether the motor driving state (the previous value) is the release-ongoing state, similarly to FIGS. 16 and 17. If "NO" is determined in S81, i.e., the motor driving state (the previous value) is determined not to be the release-ongoing state, the processing proceeds to S101. In S101, the release completion determination is set to "OFF". Then, the processing proceeds to END. On the other hand, if "YES" is determined in S81, i.e., the motor driving state (the previous value) is determined to be the release-ongoing state, the processing proceeds to S102. In S102, the release completion determination portion 37C determines whether the release stroke is equal to or greater than the target release stroke.

The release stroke is input from the release stroke calculation portion 37B to the release completion determination portion 37C. The target release stroke is input from the target release stroke calculation portion 37A to the release completion determination portion 37C. If "NO" is determined in S102, i.e., the release stroke is determined not to be equal to or greater than the target release stroke, the processing proceeds to S101. On the other hand, if "YES" is determined in S102, i.e., the release stroke is determined to be equal to or greater than the target release stroke, the processing proceeds to S103. In S103, the release completion determination is set to "ON". Then, the processing proceeds to END.

In this manner, if the release stroke reaches or exceeds the target release stroke during the release (the motor driving state (the previous value)=the release-ongoing state), the release completion determination portion 37C switches the release completion determination to ON. On the other hand, if the release stroke is shorter than the target release stroke, the release completion determination portion 37C keeps the release completion determination set to OFF. On the other hand, except during the release, the target release stroke calculation portion 37A keeps the release completion determination set to OFF because the completion of the release does not have to be determined. The release completion determination portion 37C may determine that the clearance is secured by driving the electric motor 7A for a predetermined time after conducting the release using a stroke as far as the position at which the rotation-linear motion conversion mechanism 8 (the linear motion member 8A2) departs (separates) from the piston 6D (the position at which the load is removed) by setting the target release stroke=the corrected application stroke. In other words, the release completion determination portion 37C may determine that the release is completed when determining that the clearance is secured using a time from the position at which the load is removed.

Next, the EEPROM portion 38 will be described with reference to FIG. 19.

The EEPROM portion 38 sets the corrected application stroke to be written into the nonvolatile memory and also sets the writing request directed to the nonvolatile memory to allow the release to be controlled so as to secure the intended clearance even if the RAM value information is lost due to, for example, the startup signal switched to OFF after the application is conducted. In other words, the EEPROM portion 38 determines whether the application stroke should be stored into the nonvolatile memory, and sets the corrected application stroke to the corrected application stroke (the written value) if storing the application stroke. FIG. 19 illustrates EEPROM writing processing performed by the EEPROM portion 38. The processing illustrated in FIG. 19 is repeatedly performed every predetermined control cycle (for example, 10 ms).

Figure 19:
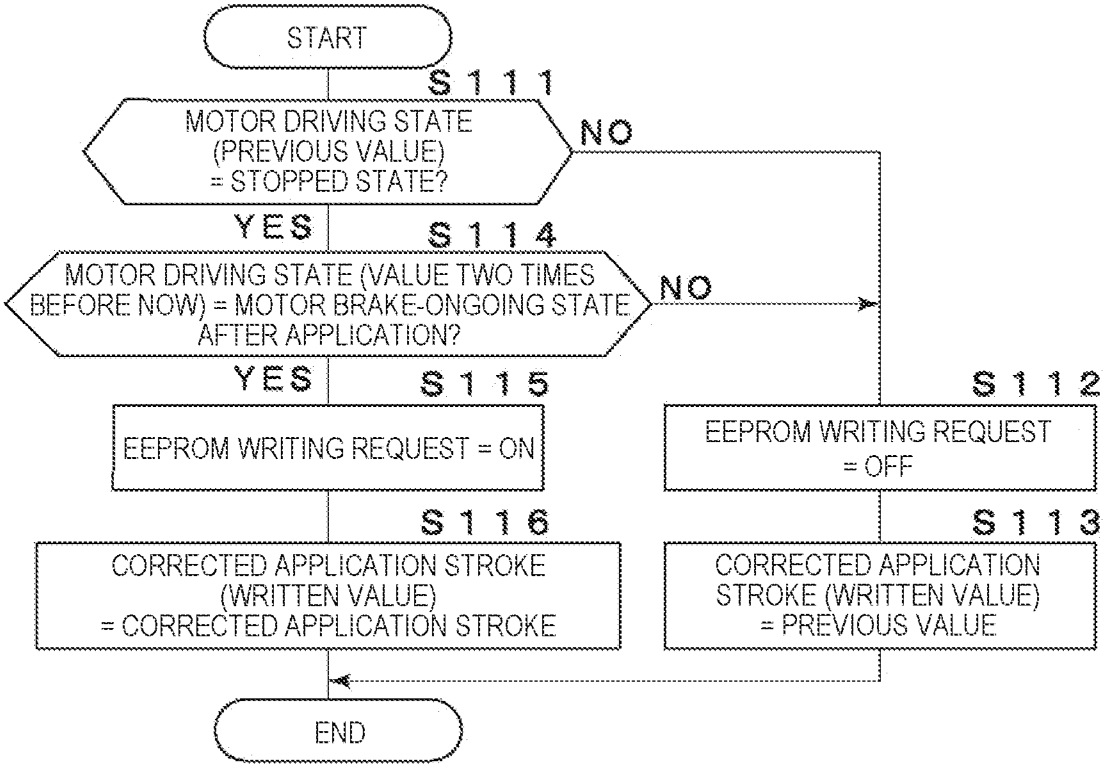
FIG. 19 is a flowchart illustrating processing performed by an EEPROM processing portion illustrated in FIG. 5 (EEPROM processing).
Figure 20:
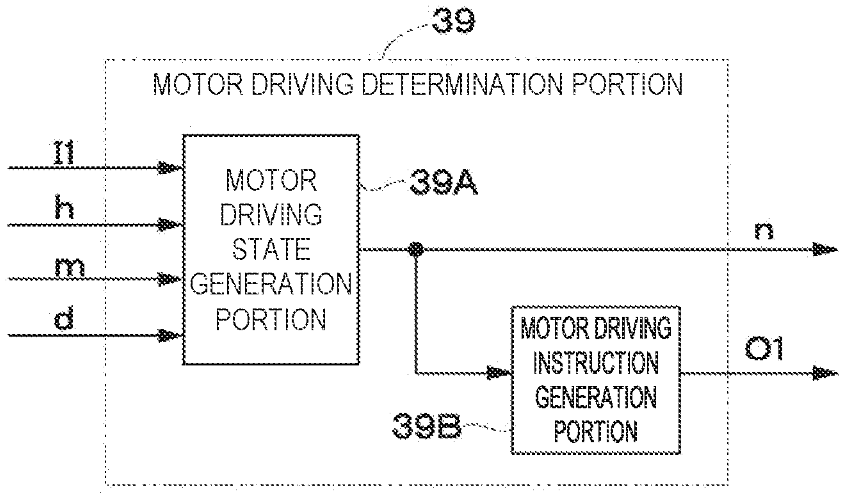
FIG. 20 is a block diagram illustrating a motor driving determination portion illustrated in FIG. 5.

After the processing illustrated in FIG. 19 is started, in S111, the EEPROM portion 38 determines whether the motor driving state (the previous value) is the stopped state. If "NO" is determined in S111, i.e., the motor driving state (the previous value) is determined not to be the stopped state, the processing proceeds to S112 and S113. That is, in S112, the EEPROM writing request is set to OFF. In S113, the corrected application stroke (the written value) is set to the previous value. Then, the processing proceeds to END. On the other hand, if "YES" is determined in S111, i.e., the motor driving state (the previous value) is determined to be the stopped state, the processing proceeds to S114. In S114, the EEPROM portion 38 determines whether the motor driving state (a value two times before now) is the motor brake-ongoing state after the application is completed.

If "NO" is determined in S114, i.e., the motor driving state (the value two times before now) is determined not to be the motor brake-ongoing state after the application is completed, the processing proceeds to S112. On the other hand, if "YES" is determined in S114, i.e., the motor driving state (the value two times before now) is determined to be the motor brake-ongoing state after the application is completed, the processing proceeds to S115 and S116. That is, in S115, the EEPROM writing request is set to ON. In S116, the corrected application stroke (the written value) is set to the corrected application stroke. Then, the processing proceeds to END. The corrected application stroke is input from the application control portion 36 (the corrected application stroke calculation portion 36D) to the EEPROM portion 38.

In this manner, the EEPROM portion 38 sets the EEPROM writing request to ON and the corrected application stroke (the written value) to the corrected application stroke at a timing when the electric motor 7A is stopped after the application is completed (the motor driving state (the previous value)=the stopped state and the motor driving state (the value two times before now)=the motor brake-ongoing state after the application is completed). Further, after the electric motor 7A is stopped, the corrected application stroke required for the release control is not changed, and therefore the EEPROM portion 38 sets the EEPROM writing request to OFF and latches (holds) the corrected application stroke (the written value). Further, except at the timing when the electric motor 7A is stopped after the application is completed, the corrected application stroke does not have to be written into the EEPROM, and therefore the EEPROM portion 38 sets the EEPROM writing request to OFF and latches (holds) the corrected application stroke (written value) except in the case of the motor driving state (the previous value)=the stopped state.

Next, the motor driving determination portion 39 will be described with reference to FIGS. 20 to 23.

The motor driving determination portion 39 generates a state for determining whether various kinds of processing by the application control portion 36 and the release control portion 37 should be performed, and generates an instruction value to request the motor driving circuit 28 to set the power supply to ON (the application/release)/OFF (stop)/shorting. To fulfill this function, the motor driving determination portion 39 includes two blocks, i.e., a motor driving state generation portion 39A and a motor driving instruction generation portion 39B.

The PKB actuation request, the application completion determination, the release completion determination, and the motor stop determination are input to the motor driving state generation portion 39A. The motor driving state generation portion 39A determines the driving state of the electric motor 7A based on the PKB actuation request, the application completion determination, the release completion determination, and the motor stop determination. The motor driving state generation portion 39A outputs the motor driving state, which is a result of the determination, to the motor driving instruction generation portion 39B and the I/z portion 41. The motor driving state is input to the motor driving instruction generation portion 39B. The motor driving instruction generation portion 39B generates an instruction directed to the motor driving circuit 28 based on the motor driving state, which is the driving state of the motor 7A. The motor driving instruction generation portion 39B outputs the generated instruction to the motor driving circuit 28 as a motor driving instruction.

Next, the motor driving state generation portion 39A will be described with reference to FIG. 21.

The motor driving state generation portion 39A determines the driving state of the electric motor 7A based on the PKB actuation request, the application completion determination, the release completion determination, and the motor stop determination. In other words, the motor driving state generation portion 39A generates five states, the "stopped state", the "application-ongoing state", the "release-ongoing state", the "motor brake-ongoing state after the application", and the "motor brake-ongoing state after the release" using the PKB actuation request, the application completion determination, the release completion determination, and the motor stop determination. The determination result (the generation result), i.e., which one is the driving state of the electric motor 7A, the "stopped state", the "application-ongoing state", the "release-ongoing state", the "motor brake-ongoing state after the application", or the "motor brake-ongoing state after the release", is used to determine whether the various kinds of calculations should be carried out by the application control portion 36 and the release control portion 37 and calculate the instruction value directed to the motor driving circuit 28.

Figure 21:
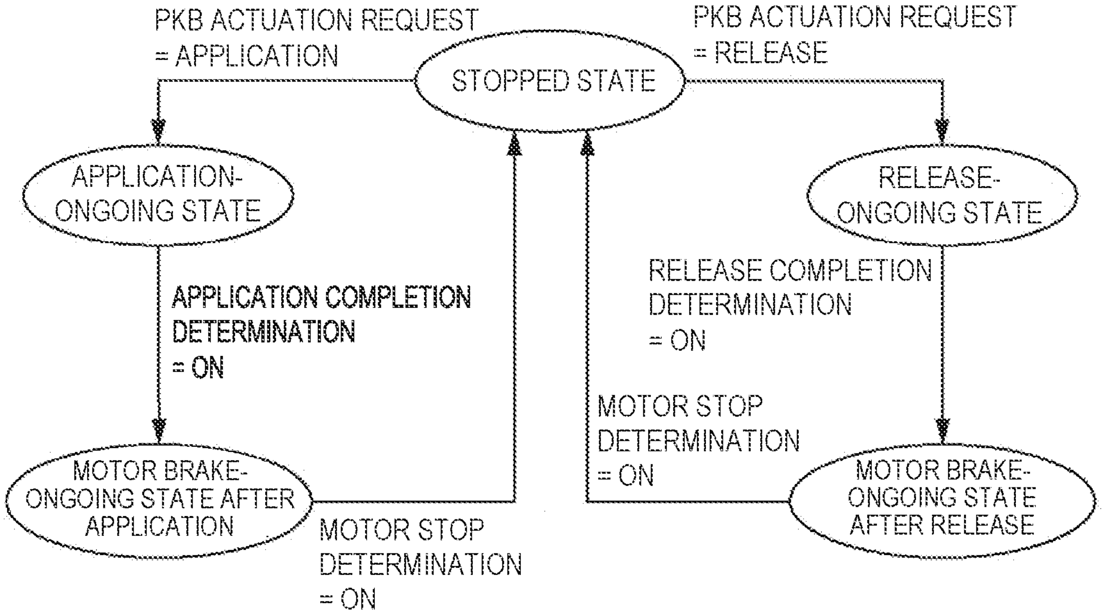
FIG. 21 illustrates processing by a motor driving state generation portion illustrated in FIG. 20 (motor driving state generation processing).

As illustrated in FIG. 21, the motor driving state generation portion 39A switches the motor driving state to the "application-ongoing state" if the PKB actuation request is switched to the application or to the "release-ongoing state" if the PKB actuation request is switched to the release, when the motor driving state is the "stopped state". On the other hand, the motor driving state generation portion 39A switches the motor driving state to the "motor brake-ongoing state after the application" if the application completion determination is switched to ON when the motor driving state is the "application-ongoing state". On the other hand, the motor driving state generation portion 39A switches the motor driving state to the "motor brake-ongoing state after the release" if the release completion determination is switched to ON when the motor driving state is the "release-ongoing state". On the other hand, the motor driving state generation portion 39A switches the motor driving state to the "stopped state" if the motor stop determination is switched to ON when the motor driving state is the "motor brake-ongoing state after the application" or the "motor brake-ongoing state after the release".

Next, the motor driving instruction generation portion 39B will be described with reference to FIGS. 22 and 23.

The motor driving instruction generation portion 39B generates the instruction value (the control instruction) to instruct the motor driving circuit 28 to set the power supply to the electric motor 7A to ON (the application or the release)/OFF/shorting. In other words, the motor driving instruction generation portion 39B generates an instruction value to instruct the motor driving circuit 28 to switch the power supply to ON (application/release), OFF (stop), or the motor brake according to the motor driving state. FIG. 22 illustrates motor driving instruction generation processing performed by the motor driving instruction generation portion 39B. The processing illustrated in FIG. 22 is repeatedly performed every predetermined control cycle (for example, 10 ms).

Figure 22:
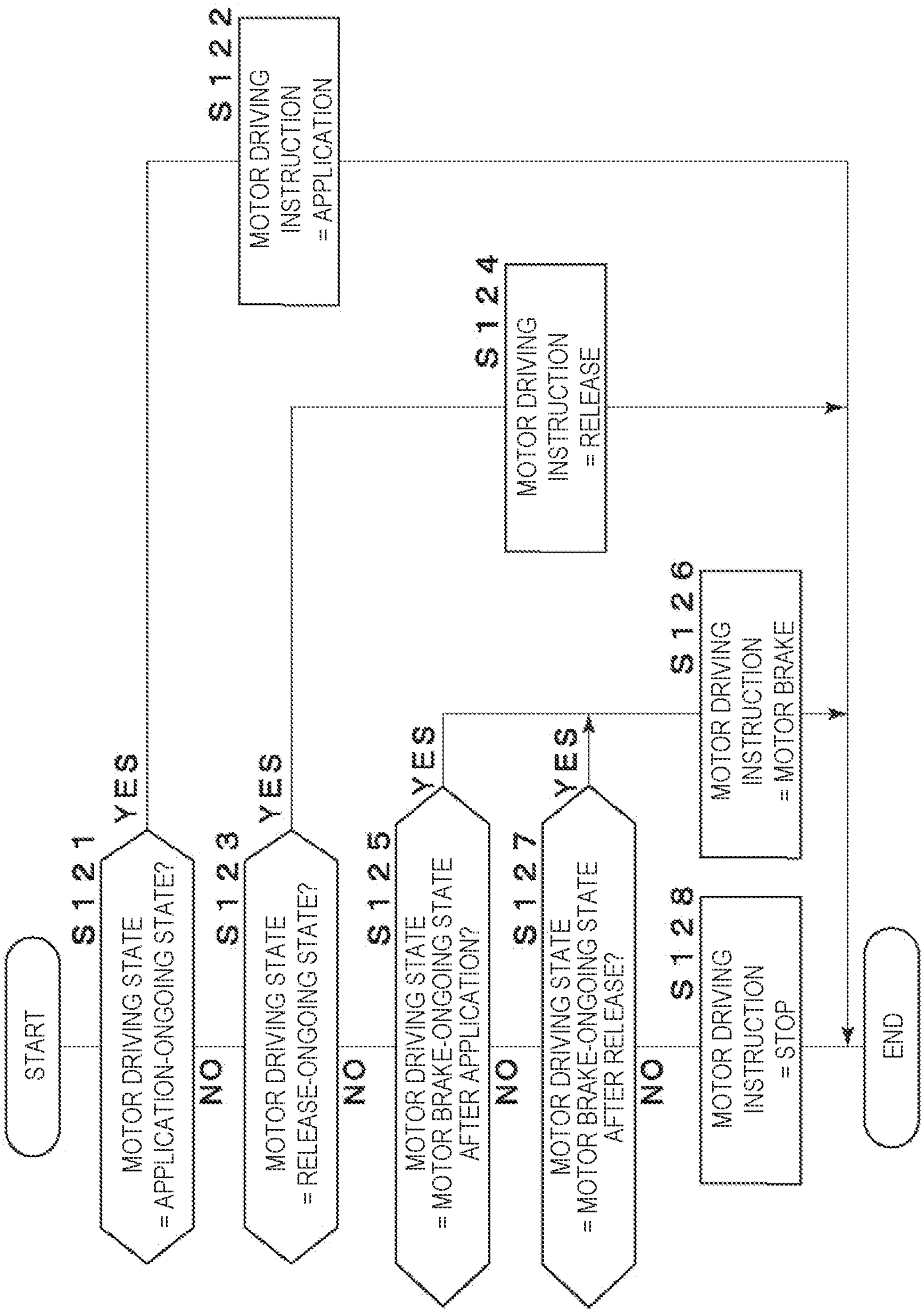
FIG. 22 is a flowchart illustrating processing performed by a motor driving instruction generation portion illustrated in FIG. 20 (motor driving instruction generation processing).

After the processing illustrated in FIG. 22 is started, in S121, the motor driving instruction generation portion 39B determines whether the motor driving state is the application-ongoing state. If "YES" is determined in S121, i.e., the motor driving state is determined to be the application-ongoing state, the processing proceeds to S122. In S122, the motor driving instruction (the control instruction) is set to the application. Then, the processing proceeds to END. On the other hand, if "NO" is determined in S122, i.e., the motor driving state is determined not to be the application-ongoing state, the processing proceeds to S123.

In S123, the motor driving instruction generation portion 39B determines whether the motor driving state is the release-ongoing state. If "YES" is determined in S123, i.e., the motor driving state is determined to be the release-ongoing state, the processing proceeds to S124. In S124, the motor driving instruction (the control instruction) is set to the release. Then, the processing proceeds to END. On the other hand, if "NO" is determined in S123, i.e., the motor driving state is determined not to be the release-ongoing state, the processing proceeds to S125.

In S125, the motor driving instruction generation portion 39B determines whether the motor driving state is the motor brake-ongoing state after the application. If "YES" is determined in S125, i.e., the motor driving state is determined to be the motor brake-ongoing state after the application, the processing proceeds to S126. In S126, the motor driving instruction (the control instruction) is set to the motor brake. Then, the processing proceeds to END. On the other hand, if "NO" is determined in S126, i.e., the motor driving state is determined not to be the motor brake-ongoing state after the application, the processing proceeds to S127.

In S127, the motor driving instruction generation portion 39B determines whether the motor driving state is the motor brake-ongoing state after the release. If "YES" is determined in S127, i.e., the motor driving state is determined to be the motor brake-ongoing state after the release, the processing proceeds to S126. On the other hand, if "NO" is determined in S127, i.e., the motor driving state is determined not to be the motor brake-ongoing state after the release, the processing proceeds to S128. In S128, the motor driving instruction (the control instruction) is set to the stop. Then, the processing proceeds to END.

In this manner, if the motor driving state is switched to the application-ongoing state, the motor driving instruction generation portion 39B switches the motor driving instruction to the application. If the motor driving state is switched to the release-ongoing state, the motor driving instruction generation portion 39B switches the motor driving instruction to the release. If the motor driving state is switched to the "motor brake-ongoing state after the application" or the "motor brake-ongoing state after the release", the motor driving instruction generation portion 39B switches the motor driving instruction to the motor brake. If the motor driving state is none of the above-described states (the stopped state), the motor driving instruction generation portion 39B sets the motor driving instruction to the stop. FIG. 23 illustrates the relationship between the motor driving instruction (the control instruction) output from the motor driving instruction generation portion 39B to the motor driving circuit 28 and the operation of the motor driving circuit 28 to which this motor driving instruction is input.

In this manner, in the embodiment, the rear-side disk brake 6 as the electric brake includes the electric motor 7A. The electric motor 7A drives the parking brake mechanism (the rotation-linear motion conversion mechanism 8) configured to provide the braking force to the vehicle and hold the braking force. The electric motor 7A is controlled by the braking control apparatus 17 (the parking brake control apparatus 31). In other words, the braking control apparatus 17 (the parking brake control apparatus 31) is the control apparatus for the electric brake (the rear-side disk brake 6). In the embodiment, the electric brake apparatus includes the rotation-linear motion conversion mechanism 8 as the parking brake mechanism configured to provide the braking force to the vehicle and hold the braking force, the electric motor 7A configured to drive the rotation-linear motion conversion mechanism 8, and the braking control apparatus 17 (the parking brake control apparatus 31) configured to control the electric motor 7A.

The braking control apparatus 17 (the parking brake control apparatus 31) includes the control portion (the arithmetic circuit 24) configured to control the electric motor 7A. In the application, which refers to the holding actuation of the parking brake mechanism (the rotation-linear motion conversion mechanism 8), the control portion (the arithmetic circuit 24) of the braking control apparatus 17 (the parking brake control apparatus 31) determines the physical amount regarding the loaded stroke at the time of the application (the application stroke) from the load detection point including as far as the overshoot amount. The load detection point is the generation point of the thrust force that is detected due to the current flowing in the electric motor 7A. The overshoot amount is generated based on the rotation of the electric motor 7A due to the inertia after the driving of the electric motor 7A is stopped.

The control portion (the arithmetic circuit 24) of the braking control apparatus 17 (the parking brake control apparatus 31) determines the physical amount regarding the target release stroke (the target release stroke) in the release, which refers to the release actuation of the parking brake mechanism (the rotation-linear motion conversion mechanism 8), according to the physical amount regarding the loaded stroke at the time of the application (the application stroke). The control portion (the arithmetic circuit 24) of the braking control apparatus 17 (the parking brake control apparatus 31) outputs the control instruction to conduct the release based on the physical amount regarding the target release stroke (the target release stroke).

Examples usable as the physical amount regarding the loaded stroke at the time of the application include the thrust force corresponding to the loaded stroke at the time of the application, the current corresponding to the loaded stroke at the time of the application, and the time (the driving time) corresponding to the loaded stroke at the time of the application, besides the stroke amount directly corresponding to the loaded stroke at the time of the application (for example, the integrated value of the motor rotational speed). Similarly, examples usable as the physical amount regarding the target release stroke include the thrust force corresponding to the target release stroke, the current corresponding to the target release stroke, and the time (the driving time) corresponding to the target release stroke, besides the stroke amount directly corresponding to the target release stroke (for example, the integrated value of the motor rotational speed).

Then, the rotation of the electric motor 7A due to the inertia after the driving of the electric motor 7A is stopped depends on the torque and the voltage. The torque generated when the application operation is completed depends on the inertia and the rotational acceleration. The rotational speed during the application depends on the voltage as seen from the above-described equation 1. Therefore, the rotation of the electric motor 7A due to the inertia after the driving of the electric motor 7A is stopped varies due to a voltage applied to the electric motor 7A just before the application operation is completed. In light thereof, the embodiment calculates the motor rotational speed ω using the voltage applied to the electric motor 7A (the voltage between the terminals) and calculates the application stroke based on the integration of the motor rotational speed ω, and also calculates the application stroke based on the integration of the motor rotational speed ω during the motor brake after the application. Further, the load detection point corresponds to the timing at which the parking brake mechanism (the rotation-linear motion conversion mechanism 8, more specifically, the linear motion member 8A2) abuts against the piston 6D pressing the frictional member (the brake pads 6C) of the frictional braking apparatus (the rear-side disk brake 6), which provides the braking force to the vehicle.

The control portion (the arithmetic circuit 24) determines the correction value based on the displacement amount of the load detection point that is generated according to the movement of the piston 6D due to the brake hydraulic pressure. In other words, the control portion (the arithmetic circuit 24) determines the correction value of the stroke amount based on the hydraulic pressure at the load detection time that corresponds to the displacement amount of the load detection point (refer to the correction value calculation table illustrated in FIG. 11). The control portion (the arithmetic circuit 24) determines the physical amount regarding the loaded stroke at the time of the application by adding the correction value (the corrected application stroke). On the rear-side disk brake 6 as the electric brake according to the present embodiment, the correction value increases as the brake hydraulic pressure at the load detection point increases as illustrated in FIG. 11. However, the correction value may have a characteristic of reducing as the brake hydraulic pressure increases depending on an embodiment.

The control portion (the arithmetic circuit 24) determines the physical amount regarding the target release stroke (the target release stroke) by adding the predetermined target clearance as indicated in S94 and S93 in FIG. 17. The target clearance may be set as the driving time of the electric motor 7A. More specifically, the control portion (the arithmetic circuit 24) may determine the control instruction by adding control of rotating the electric motor 7A for a predetermined time after setting the physical amount regarding the target release stroke (the target release stroke) to the physical amount regarding the loaded stroke at the time of the application (the corrected application stroke) and conducting the release based on the physical amount regarding the target release stroke (the target release stroke=the corrected application stroke).

The control portion (the arithmetic circuit 24) stores the physical amount regarding the loaded stroke at the time of the application (the corrected application stroke) into the EEPROM (the memory 25) functioning as the nonvolatile memory by the EEPROM portion 38 (the processing illustrated in FIG. 19). If the physical amount regarding the loaded stroke at the time of the application (the corrected application stroke) that is determined in the same cycle cannot be acquired by the release control portion 37, more specifically, the target release stroke calculation portion (the processing illustrated in FIG. 17), the control portion (the arithmetic circuit 24) determines the physical amount regarding the target release stroke (the target release stroke) using the previous value of the physical amount regarding the loaded stroke at the time of the application that is stored in the EEPROM (the memory 25) functioning as the nonvolatile memory (the corrected application stroke (the stored value)).

The brake system of the four-wheeled automobile according to the embodiment is configured in the above-described manner, and the operation thereof will be described next.

When the driver of the vehicle operates the brake pedal 9 by pressing it, this pressing force is transmitted to the master cylinder 12 via the booster 11, and the brake hydraulic pressure is generated by the master cylinder 12. The brake hydraulic pressure generated in the master cylinder 12 is supplied to the individual disk brakes 5 and 6 via the cylinder-side hydraulic pressure pipes 14A and 14B, the ESC 16, and the brake-side pipe portions 15A, 15B, 15C, and 15D, and the braking force is applied to each of the left and right front wheels 2 and the left and right rear wheels 3.

In this case, in each of the disk brakes 5 and 6, the piston 5B or 6D is slidably displaced toward the brake pads 6C according to an increase in the brake hydraulic pressure in the caliper 5A or 6B, and the brake pads 6C are pressed against the disk rotor 4 or 4. As a result, the braking force based on the hydraulic pressure is generated. On the other hand, when the brake operation is released, the supply of the brake hydraulic pressure into the caliper 5A or 6B is stopped, which causes the piston 5B or 6D to be displaced so as to separate (retract) from the disk rotor 4 or 4. As a result, the brake pads 6C separate from the disk rotor 4 or 4, and the vehicle is returned into a non-braked state.

Next, when the driver of the vehicle operates the parking brake switch 23 toward the braking side (the application side), power is supplied from the braking control apparatus 17 (the parking brake control apparatus 31) to the electric motor 7A of the rear wheel-side disk brake 6 on each of the left side and the right side, and the electric motor 7A is rotationally driven. On the rear wheel-side disk brake 6, the rotational motion of the electric motor 7A is converted into the linear motion by the rotation-linear motion conversion mechanism 8, and the piston 6D is thrust by the rotation-linear motion member 8A. As a result, the disk rotor 4 is pressed by the brake pads 6C. At this time, the rotation-linear motion conversion mechanism 8 (the liner motion member 8A2) is kept in the braking state with the aid of, for example, the frictional force (the holding force) due to the threaded engagement. As a result, the rear wheel-side disk brake 6 is actuated (applied) as the parking brake. In other words, even after the power supply to the electric motor 7A is stopped, the piston 6D is held at the braking position by the rotation-linear motion conversion mechanism 8.

On the other hand, when the driver operates the parking brake switch 23 toward the braking release side (the release side), power is supplied from the braking control apparatus 17 (the parking brake control apparatus 31) to the electric motor 7A so as to rotate the motor in the reverse direction. Due to this power supply, the electric motor 7A is rotated in the opposite direction from the direction at the time of the actuation of the parking brake (the application). At this time, the braking force maintained by the rotation-linear motion conversion mechanism 8 is released, which allows the piston 6D to be displaced in a direction away from the disk rotor 4. As a result, the actuation of the rear wheel-side disk brake 6 as the parking brake is stopped (released).

Then, according to the embodiment, the braking control apparatus 17 (the parking brake control apparatus 31) determines the target release stroke at the time of the release according to the loaded stroke at the time of the application (the application stroke) from the load detection point at the time of the application including as far as the overshoot amount. Therefore, the target release stroke at the time of the release can be determined as the target release stroke in which the overshoot amount (the rotation of the electric motor 7A due to the inertia after the driving of the electric motor 7A is stopped) is reflected. As a result, the accuracy of controlling the clearance can be improved.

According to the embodiment, the braking control apparatus 17 (the parking brake control apparatus 31) calculates the motor rotational speed ω using the voltage applied to the electric motor 7A (the voltage between the terminals) and calculates the application stroke based on the integration of the motor rotational speed ω, and also calculates the application stroke based on the integration of the motor rotational speed ω during the motor brake after the application. Therefore, the overshoot amount according to the voltage of the electric motor 7A just before the application operation is completed (the rotation of the electric motor 7A due to the inertia after the driving of the electric motor 7A is stopped) can be reflected in the loaded stroke at the time of the application (the application stroke) and thus the target release stroke. In other words, the overshoot amount depends on the rotational speed of the electric motor 7A, and the rotational speed of the electric motor 7A depends on the voltage. Therefore, the accurate overshoot amount according to the voltage of the electric motor 7A just before the application operation is completed can be reflected.

According to the embodiment, the load detection point is assumed to be the timing at which the rotation-linear motion conversion mechanism 8 (more specifically, the linear motion member 8A2) as the parking brake mechanism abuts against the piston 6D. Therefore, the target release stroke at the time of the release can be determined according to the loaded stroke at the time of the application (the application stroke) including as far as the overshoot amount since the rotation-linear motion conversion mechanism 8 (the linear motion member 8A2) and the piston 6D abut against each other at the time of the application.

According to the embodiment, as illustrated in FIGS. 10, 11, and 13, the braking control apparatus 17 (the parking brake control apparatus 31) can reflect the displacement amount of the load detection point due to the brake hydraulic pressure in the loaded stroke at the time of the application (the corrected application stroke) and thus the target release stroke as the correction value. More specifically, when a brake hydraulic pressure is generated due to, for example, an operation on the brake pedal, the piston is pressed in toward the disk rotor 4 side (the brake pad 6C side) by this brake hydraulic pressure. Due to that, the load detection point may be detected in a state that the rotation-linear motion conversion mechanism 8 (the linear motion member 8A2) strokes beyond the normal load detection point. Therefore, the braking control apparatus 17 (the parking brake control apparatus 31) can determine the corrected application stroke and thus the target release stroke in which the amount of such a displacement of the load detection point due to the brake hydraulic pressure (i.e., the amount corresponding to the stroke changed due to the brake hydraulic pressure) is reflected as the correction value. As a result, the accuracy of controlling the clearance can also be improved from this viewpoint.

According to the embodiment, the correction value increases as the brake hydraulic pressure at the load detection point increases as illustrated in FIG. 11. Therefore, the correction value according to the displacement amount of the load detection point due to the brake hydraulic pressure can be accurately determined.

According to the embodiment, the target release stroke is determined by adding the predetermined target clearance as illustrated in FIG. 17. Therefore, the clearance required for the target release clearance (the target clearance) can be reflected therein. As a result, the release can be ended at a position that the piston reaches by stroking as far as the position where the thrust force is unloaded and also stroking by a distance corresponding to the target clearance. The release may be ended at a position that the piston reaches by stroking as far as the position where the thrust force is unloaded based on the corrected application stroke, and, after that, also stroking by the amount corresponding to the clearance by means of a rotation of the electric motor for a predetermined time, at the time of the release. In other words, the piston may be caused to stroke by the amount corresponding to the clearance by rotating the electric motor for the predetermined time from the position where the thrust force is unloaded. In either case, the clearance can be secured.

According to the embodiment, the loaded stroke at the time of the application that is stored in the EEPROM (the nonvolatile memory) (the corrected application stroke (the stored value)) can be used when necessary, as illustrated in FIG. 17. Therefore, when the startup signal switched off between the application and the release leads to a failure to refer to the loaded stroke at the time of the application that is calculated at the time of the application (the corrected application stroke), the loaded stroke at the time of the application that is stored in the EEPROM (the nonvolatile memory) (the corrected application stroke (the stored value)) can be used. In other words, the loaded stroke at the time of the application that is determined in the same cycle (the corrected application stroke) can be used when the loaded stroke at the time of the application that is determined in the same cycle (the corrected application stroke) can be acquired, and the previous value of the loaded stroke at the time of the application that is stored in the EEPROM (the nonvolatile memory) (the corrected application stroke (the stored value)) can be used when the loaded stroke at the time of the application that is determined in the same cycle (the corrected application stroke) cannot be acquired. As a result, an appropriate loaded stroke at the time of the application can be used anytime.

The embodiment has been described referring to the example when the hydraulic disk brake equipped with the electric parking brake function is employed as the rear wheel-side disk brake 6, and, along therewith, the hydraulic disk brake unequipped with the electric parking brake function is employed as the front wheel-side disk brake 5. However, the rear wheel-side disk brake 6 and the front wheel-side disk brake 5 are not limited thereto, and, for example, the hydraulic disk brake unequipped with the electric parking brake function may be employed as the rear wheel-side disk brake 6, and, along therewith, the hydraulic disk brake equipped with the electric parking brake function may be employed as the front wheel-side disk brake 5. Further, the hydraulic disk brake equipped with the electric parking brake function may be employed as both the front wheel-side disk brake 5 and the rear wheel-side disk brake 6. In sum, the brakes on at least a pair of left and right wheels, among the wheels of the vehicle, can be constituted by the electric parking brake.

The embodiment has been described citing the hydraulic disk brake equipped with the electric parking brake 6 as the electric brake (the electric brake mechanism) by way of example. However, the brake mechanism is not limited to the disk brake-type brake mechanism, and may be configured as a drum brake-type brake mechanism. Further examples of the configuration employable as the electric parking brake include various types of brake mechanisms, such as a drum-in disk brake in which a drum-type electric parking brake is provided in a disk brake, and a configuration that holds the parking bake by pulling a cable using an electric motor. Alternatively, an electric disk brake including an electric caliper that provides a service brake using an electric motor may be used. This case does not involve the provision of the braking force based on the hydraulic pressure, and therefore can omit the processing for the "stroke corresponding to the pad movement amount, deformation amount, and the like due to the hydraulic pressure", i.e., the processing relating to the "correction value" based on the displacement amount of the load detection point due to the brake hydraulic pressure.

Possible configurations as a control apparatus for an electric brake, an electric brake apparatus, and a method for controlling an electric brake based on the above-described embodiment include the following examples.

As a first configuration, a control apparatus for an electric brake includes a control portion configured to control an electric motor. The electric motor is configured to drive a parking brake mechanism. The parking brake mechanism is configured to provide a braking force to a vehicle and hold the braking force. In an application, which refers to holding actuation of the parking brake mechanism, the control portion determines a physical amount regarding a loaded stroke at the time of the application from a load detection point including as far as an overshoot amount. The load detection point is a generation point of a thrust force that is detected due to a current flowing in the electric motor. The overshoot amount is generated based on a rotation of the electric motor due to inertia after driving of the electric motor is stopped. The control portion determines a physical amount regarding a target release stroke in a release, which refers to release actuation of the parking brake mechanism, according to the physical amount regarding the loaded stroke at the time of the application. The control portion outputs a control instruction to conduct the release based on the physical amount regarding the target release stroke.

According to this first configuration, the physical amount regarding the target release stroke at the time of the release is determined according to the physical amount regarding the loaded stroke at the time of the application from the load detection point at the time of the application including as far as the overshoot amount. Therefore, the physical amount regarding the target release stroke at the time of the release can be determined as the target release stroke in which the overshoot amount (the rotation of the electric motor due to the inertia after the driving of the electric motor is stopped) is reflected. As a result, the accuracy of controlling the clearance can be improved.

As a second configuration, in the first configuration, the rotation of the electric motor due to the inertia after the driving of the electric motor is stopped varies due to a voltage applied to the electric motor just before the application is completed.

According to this second configuration, the overshoot amount according to the voltage of the electric motor just before the application operation is completed (the rotation of the electric motor due to the inertia after the driving of the electric motor is stopped) can be reflected in the physical amount regarding the loaded stroke at the time of the application (and thus the physical amount regarding the target release stroke). In other words, the overshoot amount depends on the rotational speed of the electric motor, and the motor rotational speed of the electric motor depends on the voltage. Therefore, the accurate overshoot amount according to the voltage of the electric motor just before the application operation is completed can be reflected.

As a third configuration, in the first configuration, the load detection point is a timing at which the parking brake mechanism abuts against a piston. The piston is configured to press a frictional member of a frictional braking apparatus that provides the braking force to the vehicle.

According to this third configuration, the load detection point can be placed at the timing when the parking brake mechanism abuts against the piston. For example, the parking brake mechanism corresponds to a rotation-linear motion conversion mechanism that converts a rotational motion of the electric motor into a linear motion, a speed reducer, and the like. In the case where the parking brake mechanism is constituted by such a rotation-linear motion conversion mechanism, for example, the load detection point can be placed at a timing when a linear motion member of the rotation-linear motion conversion mechanism abuts against the piston.

As a fourth configuration, in the third configuration, the control portion determines a correction value based on a displacement amount of the load detection point that is generated according to a movement of the piston due to a brake hydraulic pressure, and determines the physical amount regarding the loaded stroke at the time of the application based on the correction value.

According to this fourth configuration, the displacement amount of the load detection point due to the brake hydraulic pressure can be reflected in the physical amount regarding the loaded stroke at the time of the application (and thus the physical amount regarding the target release stroke) as the correction value. More specifically, when a brake hydraulic pressure is generated due to, for example, an operation on a brake pedal, the piston is pressed in toward the rotor side (the frictional pad side) by this brake hydraulic pressure. Due to that, the load detection point may be detected in a state that the parking brake mechanism strokes beyond the normal load detection point. Therefore, such a displacement amount of the load detection point due to the brake hydraulic pressure (i.e., an amount corresponding to a stroke varying depending on the brake hydraulic pressure) can be reflected in the physical amount regarding the loaded stroke at the time of the application (and thus the physical amount regarding the target release stroke) as the correction value. As a result, the accuracy of controlling the clearance can also be improved from this viewpoint.

As a fifth configuration, in the first configuration, the control portion determines the physical amount regarding the target release stroke based on a predetermined target clearance.

According to this fifth configuration, the clearance can be reflected in the physical amount regarding the target release stroke. Therefore, the release can be ended at a position that the piston reaches by stroking as far as the position where the thrust force is unloaded and also stroking by a distance corresponding to the target clearance. As a result, the clearance can be secured.

As a sixth configuration, in the first configuration, the control portion sets the physical amount regarding the target release stroke to the physical amount regarding the loaded stroke at the time of the application, and determines the control instruction by adding control of rotating the electric motor for a predetermined time after conducting the release based on the physical amount regarding the target release stroke.

According to this sixth configuration, the release can be ended at a position that the piston reaches by stroking as far as the position where the thrust force is unloaded according to the stroke corresponding to the physical amount regarding the loaded stroke at the time of the application, and, after that, also stroking by the amount corresponding to the clearance by means of a rotation of the electric motor for a predetermined time, at the time of the release. In other words, the piston can also be caused to stroke by the amount corresponding to the clearance by rotating the electric motor for the predetermined time from the position where the thrust force is unloaded. As a result, the clearance can be secured.

As a seventh configuration, in the first configuration, the control portion stores the physical amount regarding the loaded stroke at the time of the application into a nonvolatile memory.

According to this seventh configuration, the physical amount regarding the loaded stroke at the time of the application that is stored in the nonvolatile memory can be used when necessary. For example, when a startup signal switched off between the application and the release leads to a failure to refer to the physical amount regarding the loaded stroke at the time of the application that is calculated at the time of the application, the physical amount regarding the loaded stroke at the time of the application that is stored in the nonvolatile memory can be used.

As an eighth configuration, in the seventh configuration, the control portion determines the physical amount regarding the target release stroke using a previous value of the physical amount regarding the loaded stroke at the time of the application that is stored in the nonvolatile memory, when the physical amount regarding the loaded stroke at the time of the application that is determined in the same cycle cannot be acquired.

According to this eighth configuration, the loaded stroke at the time of the application that is determined in the same cycle can be used when the physical amount regarding the loaded stroke at the time of the application that is determined in the same cycle can be acquired, and the previous value of the physical amount regarding the loaded stroke at the time of the application that is stored in the nonvolatile memory can be used when the loaded stroke at the time of the application that is determined in the same cycle cannot be acquired. In other words, the control apparatus for the electric brake can determine whether to "use the loaded stroke at the time of the application that is determined in the same cycle" or to "use the previous value of the physical amount regarding the loaded stroke at the time of the application that is stored in the nonvolatile memory".

As a ninth configuration, an electric brake apparatus includes a parking brake mechanism configured to provide a braking force to a vehicle and hold the braking force, an electric motor configured to drive the parking brake mechanism, and a control apparatus configured to control the electric motor. In an application, which refers to holding actuation of the parking brake mechanism, the control apparatus determines a physical amount regarding a loaded stroke at the time of the application from a load detection point including as far as an overshoot amount. The load detection point is a generation point of a thrust force that is detected due to a current flowing in the electric motor. The overshoot amount is generated based on a rotation of the electric motor due to inertia after driving of the electric motor is stopped. The control apparatus determines a physical amount regarding a target release stroke in a release, which refers to release actuation of the parking brake mechanism, according to the physical amount regarding the loaded stroke at the time of the application. The control apparatus outputs a control instruction to conduct the release based on the physical amount regarding the target release stroke.

According to this ninth configuration, the control apparatus determines the physical amount regarding the target release stroke at the time of the release according to the physical amount regarding the loaded stroke at the time of the application from the load detection point at the time of the application including as far as the overshoot amount. Therefore, the physical amount regarding the target release stroke at the time of the release can be determined as the target release stroke in which the overshoot amount (the rotation of the electric motor due to the inertia after the driving of the electric motor is stopped) is reflected. As a result, the accuracy of controlling the clearance can be improved.

As a tenth configuration, a method for controlling an electric brake is provided. The electric brake is configured to control an electric motor. The electric motor is configured to drive a parking brake mechanism. The parking brake mechanism is configured to provide a braking force to a vehicle and hold the braking force. The method includes, in an application, which refers to holding actuation of the parking brake mechanism, determining a physical amount regarding a loaded stroke at the time of the application from a load detection point including as far as an overshoot amount. The load detection point is a generation point of a thrust force that is detected due to a current flowing in the electric motor. The overshoot amount is generated based on a rotation of the electric motor due to inertia after driving of the electric motor is stopped. The method further includes determining a physical amount regarding a target release stroke in a release, which refers to release actuation of the parking brake mechanism, according to the physical amount regarding the loaded stroke at the time of the application, and outputting a control instruction to conduct the release based on the physical amount regarding the target release stroke.

According to this tenth configuration, the physical amount regarding the target release stroke at the time of the release is determined according to the physical amount regarding the loaded stroke at the time of the application from the load detection point at the time of the application including as far as the overshoot amount. Therefore, the physical amount regarding the target release stroke at the time of the release can be determined as the target release stroke in which the overshoot amount (the rotation of the electric motor due to the inertia after the driving of the electric motor is stopped) is reflected. As a result, the accuracy of controlling the clearance can be improved.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

REFERENCE SIGNS LIST

- 6 rear wheel-side disk brake (frictional braking apparatus or electric brake)
- 6C brake pad (frictional member)
- 6D piston
- 7A electric motor
- 8 rotation-linear motion conversion mechanism (parking brake mechanism)
- 17 braking control apparatus (control apparatus)
- 24 arithmetic circuit (control portion) memory (nonvolatile memory)
- 31 parking brake control apparatus (control apparatus)

The invention claimed is:

1. A control apparatus for an electric brake, the control apparatus comprising:

a control portion configured to control an electric motor, the electric motor being configured to drive a parking brake mechanism, and the parking brake mechanism being configured to provide a braking force to a vehicle and hold the braking force, wherein the control portion is configured to:

determine, in an application which includes holding actuation of the parking brake mechanism, a physical amount regarding a loaded stroke at a time of the application from a load detection point including as far as an overshoot amount, the load detection point being a generation point of a thrust force that is detected due to a current flowing in the electric motor, the overshoot amount being based on a rotation of the electric motor due to inertia after driving of the electric motor is stopped;

determine a physical amount regarding a target release stroke in a release, which includes release actuation of the parking brake mechanism, according to the physical amount regarding the loaded stroke at the time of the application, the target release stroke being set to an amount acquired by adding a stroke including the overshoot amount from the load detection point to an application operation completion point; and output a control instruction to conduct the release based on the physical amount regarding the target release stroke.

2. The control apparatus according to claim 1, wherein the rotation of the electric motor due to the inertia after the driving of the electric motor is stopped varies due to a voltage applied to the electric motor just before the application is completed.

3. The control apparatus according to claim 1, wherein the load detection point is a timing at which the parking brake mechanism abuts against a piston, the piston being configured to press a frictional member of a frictional braking apparatus configured to provide the braking force to the vehicle.

4. The control apparatus according to claim 3, wherein the control portion is configured to:

determine a correction value based on a displacement amount of the load detection point that is generated according to a movement of the piston due to a brake hydraulic pressure; and determine the physical amount regarding the loaded stroke at the time of the application based on the correction value.

5. The control apparatus according to claim 1, wherein the control portion is configured to determine the physical amount regarding the target release stroke based on a predetermined target clearance.

6. The control apparatus according to claim 1, wherein the control portion is configured to:

set the physical amount regarding the target release stroke to the physical amount regarding the loaded stroke at the time of the application; and determine the control instruction by adding control of the rotation of the electric motor for a predetermined time after conducting the release based on the physical amount regarding the target release stroke.

7. The control apparatus according to claim 1, wherein the control portion is configured to store the physical amount regarding the loaded stroke at the time of the application in a nonvolatile memory.

8. The control apparatus according to claim 7, wherein the control portion is configured to determine the physical amount regarding the target release stroke using a previous value of the physical amount regarding the loaded stroke at the time of the application that is stored in the nonvolatile memory, when the physical amount regarding the loaded stroke at the time of the application that is determined in a same cycle cannot be acquired.

9. The control apparatus according to claim 1, wherein the target release stroke is set to the amount acquired by adding: (i) the stroke including the overshoot amount from the load detection point to the application operation completion point; (ii) a stroke corresponding to a pad movement amount or a deformation amount due to hydraulic pressure; and (iii) a target clearance.

10. An electric brake apparatus comprising:

a parking brake mechanism configured to provide a braking force to a vehicle and hold the braking force;

an electric motor configured to drive the parking brake mechanism; and a control apparatus configured to control the electric motor, wherein the control apparatus is configured to:

determine, in an application which includes holding actuation of the parking brake mechanism, a physical amount regarding a loaded stroke at a time of the application from a load detection point including as far as an overshoot amount, the load detection point being a generation point of a thrust force that is detected due to a current flowing in the electric motor, the overshoot amount being based on a rotation of the electric motor due to inertia after driving of the electric motor is stopped;

determine a physical amount regarding a target release stroke in a release, which includes release actuation of the parking brake mechanism, according to the physical amount regarding the loaded stroke at the time of the application, the target release stroke being set to an amount acquired by adding a stroke including the overshoot amount from the load detection point to an application operation completion point; and output a control instruction to conduct the release based on the physical amount regarding the target release stroke.

11. The electric brake apparatus according to claim 10, wherein the target release stroke is set to the amount acquired by adding: (i) the stroke including the overshoot amount from the load detection point to the application operation completion point; (ii) a stroke corresponding to a pad movement amount or a deformation amount due to hydraulic pressure; and (iii) a target clearance.

12. A method for controlling an electric brake, the electric brake being configured to control an electric motor, the electric motor being configured to drive a parking brake mechanism, the parking brake mechanism being configured to provide a braking force to a vehicle and hold the braking force, the method comprising:

determining, in an application which includes holding actuation of the parking brake mechanism, a physical amount regarding a loaded stroke at a time of the application from a load detection point including as far as an overshoot amount, the load detection point being a generation point of a thrust force that is detected due to a current flowing in the electric motor, the overshoot amount being based on a rotation of the electric motor due to inertia after driving of the electric motor is stopped;

determining a physical amount regarding a target release stroke in a release, which includes release actuation of the parking brake mechanism, according to the physical amount regarding the loaded stroke at the time of the application, the target release stroke being set to an amount acquired by adding a stroke including the overshoot amount from the load detection point to an application operation completion point; and outputting a control instruction to conduct the release based on the physical amount regarding the target release stroke.

13. The method according to claim 12, wherein the target release stroke is set to the amount acquired by adding: (i) the stroke including the overshoot amount from the load detection point to the application operation completion point; (ii) a stroke corresponding to a pad movement amount or a deformation amount due to hydraulic pressure; and (iii) a target clearance.

* * * * *